(12) United States Patent
Dietz et al.

(10) Patent No.: US 12,636,632 B2
(45) Date of Patent: May 26, 2026

(54) CARBON-CARBON COMPOSITE SORBENT FORMULATIONS FOR CARBON DIOXIDE ADSORPTION, AND RELATED METHODS

(71) Applicants: Schlumberger Technology Corporation, Sugar Land, TX (US); TDA Research, Inc., Golden, CO (US)

(72) Inventors: Steven Dean Dietz, Denver, CO (US); Ambalavanan Jayaraman, Highlands Ranch, CO (US); Matthew Schaefer, Lakewood, CO (US); Gokhan Omer Alptekin, Boulder, CO (US)

(73) Assignees: Schlumberger Technology Corporation, Sugar Land, TX (US); TDA Research Inc., Golden, CO (US)

( * ) Notice: Subject to any disclaimer, the term of this patent is extended or adjusted under 35 U.S.C. 154(b) by 0 days.

(21) Appl. No.: 18/667,806

(22) Filed: May 17, 2024

(65) Prior Publication Data

US 2025/0352978 A1 Nov. 20, 2025

(51) Int. Cl.
*B01J 20/20* (2006.01)
*B01D 53/02* (2006.01)
*B01J 20/28* (2006.01)
*B01J 20/30* (2006.01)
*B01J 20/32* (2006.01)

(52) U.S. Cl.
CPC .............. *B01J 20/20* (2013.01); *B01D 53/02* (2013.01); *B01J 20/28011* (2013.01); *B01J 20/28061* (2013.01); *B01J 20/28071* (2013.01); *B01J 20/28083* (2013.01); *B01J*

*20/3078* (2013.01); *B01J 20/3204* (2013.01); *B01J 20/324* (2013.01); *B01D 2253/102* (2013.01); *B01D 2253/25* (2013.01); *B01D 2253/304* (2013.01); *B01D 2253/308* (2013.01); *B01D 2257/504* (2013.01)

(58) Field of Classification Search
CPC ...... B01J 20/20; B01J 20/2801; B01J 28/061; B01J 20/28083; B01J 20/3078; B01J 20/3204; B01D 53/02; B01D 2253/102; B01D 2253/25; B01D 2253/304; B01D 2253/308; B01D 2257/504
See application file for complete search history.

(56) References Cited

U.S. PATENT DOCUMENTS 7,167,354 B2 1/2007 Dietz
7,541,312 B2 6/2009 Dietz
9,095,840 B2 8/2015 Cannon
(Continued)

*Primary Examiner* — Stuart L Hendrickson
(74) *Attorney, Agent, or Firm* — Kyle R. Miiller

(57) ABSTRACT

A carbon-carbon composite sorbent form removing carbon dioxide from a gaseous material includes a base material including a porous carbon material including pores having an average diameter within a range of from about 2 nm to about 50 nm, and an adsorption material on surfaces of the base material and surfaces defining the pores, the adsorption material having a different material composition than the base material. The adsorption material has a higher nitrogen content than the base material and includes greater than about 2.0 atomic percent nitrogen exclusive of hydrogen in the adsorption material. Related methods of forming the carbon-carbon composite sorbents and additional carbon-carbon composite sorbents are disclosed.

20 Claims, 6 Drawing Sheets

(56)  References Cited

U.S. PATENT DOCUMENTS

| | | | | |
|---|---|---|---|---|
| 9,120,079 | B1 * | 9/2015 | Dietz | B01D 53/02 |
| 10,730,752 | B2 | 8/2020 | El-Kaderi | |
| 11,077,421 | B2 * | 8/2021 | Srinivas | B01J 20/28083 |
| 12,440,822 | B1 | 10/2025 | Dietz | |
| 2006/0189475 | A1 * | 8/2006 | Petrik | B01J 20/3416 |
| | | | | 422/186.01 |
| 2013/0109562 | A1 * | 5/2013 | Wong | B01D 53/8665 |
| | | | | 502/181 |
| 2016/0001260 | A1 | 1/2016 | Tour | |
| 2018/0008968 | A1 * | 1/2018 | Pham-Huu | B01J 27/24 |
| 2020/0009532 | A1 * | 1/2020 | Olson | B01J 20/327 |
| 2021/0187480 | A1 | 6/2021 | Gebald | |
| 2025/0352977 | A1 | 11/2025 | Dietz | |
| 2025/0352979 | A1 | 11/2025 | Dietz | |

* cited by examiner

CARBON-CARBON COMPOSITE SORBENT FORMULATIONS FOR CARBON DIOXIDE ADSORPTION, AND RELATED METHODS

CROSS REFERENCE TO RELATED APPLICATIONS

N/A.

BACKGROUND

Carbon dioxide emissions are a significant contributor to greenhouse gases. For example, byproducts of fossil fuel combustion include carbon dioxide ($CO_2$) and other greenhouse gas emissions. During the combustion of fossil fuels, such as in electric power plants for the generation of electricity, flue gas from a furnace, boiler, or engine is emitted through one or more stacks to the atmosphere. The flue gas includes one or more pollutants, such as nitrogen, oxygen, water vapor, carbon dioxide, and other pollutants, including sulfur oxides, nitrogen oxides, and particulate matter. Carbon dioxide is also present in natural gas or biogas generated from anaerobic digesters. The $CO_2$ is conventionally removed from such materials to increase the concentration of methane for subsequent use.

Carbon capture and storage (CCS) involves capturing carbon dioxide from large point sources, such as power plants, and storing it underground or using it for other purposes, such as enhanced oil recovery or chemical production. CCS can help reduce greenhouse gas emissions and mitigate climate change. Methods of CCS include $CO_2$ separation from other materials (e.g., post-combustion gases, natural gas, biogas, or other sources), such as by chemical and physical solvent processes, chemical absorption, physical absorption, membrane separation with $CO_2$ selective membranes, and cryogenic methods. However, such methods of $CO_2$ separation are energy intensive. For example, chemical absorption includes absorbing the $CO_2$ in an aqueous solution including an alkanolamine (e.g., monoethanolamine (MEA), diethanolamine (DEA), methyldiethanolamine (MDEA)) to form a $CO_2$-amine complex and subsequently releasing the absorbed $CO_2$ from the $CO_2$-amine complex via steam stripping during a regeneration process. In addition, such systems for $CO_2$ separation require large capital expenses to construct. Chemical and physical solvent processes, physical absorption, membrane separation, and cryogenic methods of separation are also costly.

Other methods of $CO_2$ capture include pressure swing adsorption (PSA) and vacuum swing adsorption (VSA). Such methods use physical adsorbents, such as zeolites, carbon molecular sieves, or activated carbons, for capturing the $CO_2$. However, most adsorbents are not well suited for $CO_2$ capture from streams because they do not exhibit a high selectivity of $CO_2$ relative to water vapor, nitrogen, and methane.

BRIEF SUMMARY

In some embodiments, a carbon-carbon composite sorbent for removal of carbon dioxide from a gaseous material comprises a base material including a porous carbon material including pores having an average diameter within a range of from about 2 nm to about 50 nm, and an adsorption material on surfaces of the base material and surfaces defining the pores, the adsorption material having a different material composition than the base material. The adsorption material has a higher nitrogen content than the base material and includes greater than about 2.0 atomic percent nitrogen exclusive of hydrogen in the adsorption material.

In some embodiments, a carbon-carbon composite sorbent for removal of carbon dioxide from a gaseous material comprises a base material including activated carbon, and an adsorption material on surfaces defining pores of the activated carbon and on external surfaces of the activated carbon, the adsorption material having a different material composition than the base material. The adsorption material constitutes from about 10.0 weight percent to about 50.0 weight percent of the carbon-carbon composite sorbent.

In some embodiments, a method of forming a carbon-carbon composite sorbent comprises mixing a feed material comprising one or more carbohydrates and at least one nitrogen-containing material with a porous carbon material to form a coating material on the porous carbon material, the coating material including reaction products of the one or more carbohydrates and the at least one nitrogen-containing material, and exposing the coating material to a temperature greater than about 600° C. to carbonize the coating material and form a carbon-carbon composite sorbent. The carbon-carbon composite including a base structure including the porous carbon material, and an adsorption material on surfaces defining pores of the base structure.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 6 is a simplified schematic of a structure of a porous carbon material of carbon-carbon composite materials, according to at least one embodiment of the disclosure.

DETAILED DESCRIPTION

Figure 1:
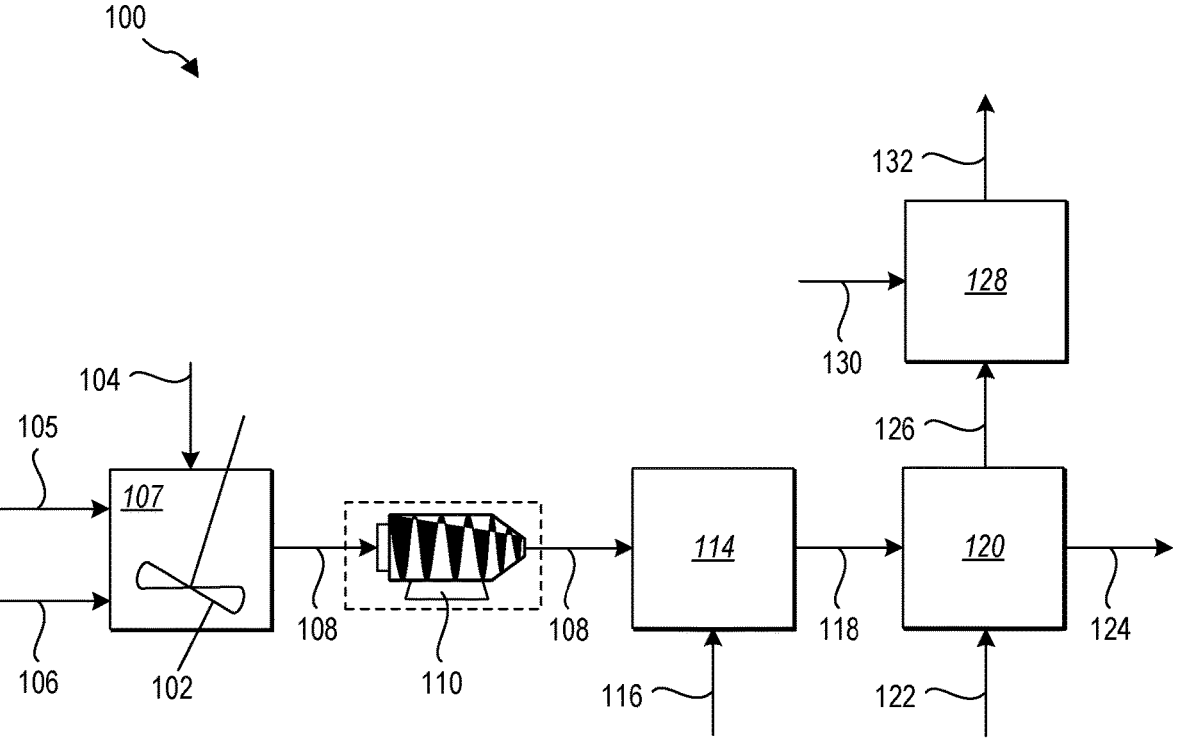
FIG. 1 is a simplified schematic illustrating a system for forming a carbon-carbon composite sorbent, according to at least one embodiment of the disclosure.

As used herein, a "mesoporous" material means and includes a material having pores including pores within a range of from about 2 nm to about 50 nm, according to the International Union of Pure and Applied Chemistry (IUPAC) nomenclature. As used herein a "microporous" material means and includes a material having pores smaller than about 2 nm.

This disclosure generally relates to carbon-carbon composite sorbents formulated and configured for physically adsorbing $CO_2$ from one or more gas streams (gaseous materials), such as a post-combustion gas stream (e.g., a flue gas). The carbon-carbon composite sorbent may be formulated and configured to selectively capture $CO_2$ by physical adsorption and may be configured for use in a pressure swing adsorption system or a vacuum swing adsorption system for selectively capturing $CO_2$ from a gas stream, such as a post-combustion gas stream.

The carbon-carbon composite sorbent may be a mesoporous material. The carbon-carbon composite sorbent may be formed of and include a base material (e.g., a backbone, a carbon scaffolding, a carbon skeleton, a carbon support structure) (also referred to as a "base structure") including mesoporous carbon. An adsorption material having a different material composition than the base material may overlie surfaces of the base material. The adsorption material may be coated on the base material such that the adsorption material overlies substantially all surfaces of the base material, including surfaces of the base material defining pores of the base material. The adsorption material overlying or on the surfaces of the base material may include one or more layers (e.g., a single layer, multiple layers) of the adsorption material overlying surfaces of the base material, including on surfaces of the base material defining the pores of the base material. Thus, the adsorption material may be on (e.g., coated on) external surfaces of the carbon-carbon composite sorbent and on surfaces of the carbon-carbon composite sorbent defining the pores (e.g., in an internal volume) of the carbon-carbon composite sorbent. Accordingly, the adsorption material overlies exposed surfaces of the carbon-carbon composite sorbent which include surfaces of the carbon-carbon composite sorbent across which air or other gases (e.g., $CO_2$-containing gases) may flow.

The material composition of the base material may be different than the material composition of the adsorption material. For example, the adsorption material may include a different atomic percent of one or more of (e.g., each of) nitrogen, carbon, hydrogen, oxygen, sulfur, and phosphorous than the base material. In some embodiments, the carbon-carbon composite sorbent comprises a non-homogeneous (e.g., a non-uniform) composition.

In some embodiments, the base material comprises, consists essentially of, or consists of carbon, hydrogen, oxygen, and includes less than about 1.0 atomic percent of each of nitrogen, sulfur, and phosphorous. The adsorption material may include nitrogen atoms covalently bonded to carbon atoms, such as to or within carbon ring structures at the surface of the carbon-carbon composite sorbent. The adsorption material may include a greater atomic percent of nitrogen and oxygen and a lower atomic percent of carbon than the base material. In some embodiments, the adsorption material includes a greater atomic percent of sulfur and/or phosphorous than the base material. A nitrogen content of the adsorption material, not including hydrogen (e.g., not considering hydrogen), may be within a range of from about 2.0 atomic percent to about 10.0 atomic percent, which may facilitate increasing the selectivity of the carbon-carbon composite sorbent to $CO_2$ relative to water and other materials (e.g., nitrogen gas ($N_2$)) that may be present in a $CO_2$-containing stream. Not considering hydrogen, the adsorption material may include greater than about 85.0 atomic percent carbon, greater than about 2.0 atomic percent nitrogen, and greater than about 2.0 atomic percent oxygen. The adsorption material may further include one or both of phosphorous or sulfur. In some embodiments, the adsorption material further includes greater than about 0.5 atomic percent sulfur, such as greater than about 1.0 atomic percent, greater than about 1.5 atomic percent, or greater than about 2.0 atomic percent sulfur, exclusive of hydrogen.

As used herein, and unless specified otherwise, the carbon content, the oxygen content, the nitrogen content, the sulfur content, and the phosphorous content (e.g., the atomic percent of carbon, oxygen, nitrogen, sulfur, and phosphorous) of the adsorption material is exclusive of (e.g., does not consider) hydrogen at the surface of the adsorption material. In other words, unless specified otherwise, the atomic percent of each of the components of the adsorption material (e.g., carbon, oxygen, nitrogen, sulfur, and phosphorous) is exclusive of hydrogen and does not consider the amount of hydrogen in the adsorption material. In some such embodiments, the atomic percents of the components of the adsorption material are normalized with respect to each other such that the atomic percent of the components exclusive of hydrogen add to 100 atomic percent (even though the adsorption material may include hydrogen). Thus, for example, a carbon content (e.g., an atomic percent of carbon) of the adsorption material exclusive of hydrogen means and includes the carbon content (e.g., the atomic percent of carbon) of the adsorption material when the atomic percent is calculated without consideration of the hydrogen in the adsorption material. Similarly, a nitrogen content, an oxygen content, a sulfur content, and a phosphorous content of the adsorption material exclusive of hydrogen means and includes the content (e.g., atomic percent) of the respective nitrogen, oxygen, sulfur, and phosphorous of the adsorption material when content is calculated without consideration of the hydrogen in the adsorption material.

The nitrogen atoms of the adsorption material may be part of a pyridone structure, a pyrrole structure, or a pyridine structure. In addition, in some embodiments, the adsorption material includes at least some carbon atoms that are double bonded to an oxygen atom and single bonded to one of a nitrogen atom or another oxygen atom (e.g., the adsorption material includes one or both of O—C═O bonds or N—C—O bonds). The adsorption material may also include lactone structures (e.g., lactone rings). The adsorption material may include conjugated carbon atoms (e.g., that are participating in π-π bonding). In some embodiments, the base material is substantially free of one or both of O—C—O bonds or N—C—O bonds, lactone rings, pyridone, pyrrole, and pyridine.

The carbon-carbon composite sorbent may exhibit a bulk density greater than a bulk density of conventional carbon sorbent materials. The relatively higher bulk density of the carbon-carbon composite sorbent may facilitate improved $CO_2$ capture by the carbon-carbon composite sorbent compared to a same volume of a conventional carbon sorbent. The bulk density of the carbon-carbon composite sorbent may be greater than about 0.50 $g/cm^3$, such as greater than about 0.55 $g/cm^3$, or even greater than about 0.60 $g/cm^3$.

The adsorption material may be formulated and configured to exhibit one or more desirable properties with respect to capture of $CO_2$. Since the adsorption material is on surfaces of the base material, and because $CO_2$ capture by the carbon-carbon composite sorbent is a surface phenomena, the carbon-carbon composite sorbent may be formed with a similar amount of nitrogen in the adsorption material (or even a greater amount of nitrogen in the adsorption material) and a lower total atomic percent of nitrogen throughout the carbon-carbon composite structure than conventional carbon sorbents. A $CO_2$ capacity of the carbon-carbon composite sorbent may be the same as, or relatively higher than, a $CO_2$ capacity of conventional carbon sorbent materials under similar conditions (e.g., temperature, pressure, and gas composition). In some embodiments, the carbon-carbon composite sorbent exhibits a higher $CO_2$ capacity per atomic percent of nitrogen compared to conventional carbon sorbents. In addition, a selectivity of the carbon-carbon composite sorbent to $CO_2$ relative to water vapor may be higher than conventional carbon sorbents. In other words, a ratio of $CO_2$ adsorbed to water adsorbed by the carbon-carbon composite sorbent may be greater than the ratio of $CO_2$ adsorbed to water adsorbed compared to conventional carbon sorbents. Further, the selectivity of the carbon-carbon composite sorbent to $CO_2$ relative to nitrogen gas ($N_2$) may be higher than that of other carbon sorbents.

The carbon-carbon composite sorbent may be formed by mixing a porous carbon material (e.g., mesoporous carbon, activated carbon), one or more carbohydrates (e.g., a sugar), a nitrogen-containing material, and optionally, a processing aid to form a feed material. In some embodiments, the feed material is mixed with an aqueous material to form a slurry. The porous carbon material may be provided to the feed material in granular, powder, and/or pellet form. The one or more carbohydrates may mix with and/or react with the nitrogen-containing material to form a coating material on surfaces of the porous carbon material, including on surfaces within and defining pores of the porous carbon material. The porous carbon material may be exposed to a carbonization process to react the one or more carbohydrates with the nitrogen-containing materials of the coating material on the surfaces of the porous carbon material and form a carbon-carbon composite sorbent including a base material formed of the porous carbon material, and an adsorption material on surfaces of the base material. The adsorption material may have a composition suitable for facilitating $CO_2$ adsorption from a gaseous stream. The adsorption material may include a greater nitrogen content (e.g., a higher atomic percent of nitrogen) than the base material and may include different types of bonds and structures than the base material. In some embodiments, the nitrogen-containing material is formed on the surfaces of the porous carbon material and the carbon-carbon composite sorbent is formed without extrusion and without activating the adsorption material (since the porous carbon material nay have a sufficiently high surface area and/or already be activated prior to being mixed in the feed material). The adsorption material may further include a greater atomic percent of one or more of (e.g., each of) oxygen, sulfur, and phosphorous than the base material.

Forming the carbon-carbon composite sorbent from the porous carbon material and forming the adsorption material on surfaces of the porous carbon material facilitates forming a carbon-carbon composite sorbent having a relatively higher $CO_2$ capacity and selectivity to $CO_2$ relative to nitrogen gas per atomic percent of nitrogen compared to conventional carbon sorbent materials. For example, the composition of the adsorption material at the surface of the carbon-carbon composite sorbent may affect the physical adsorption properties thereof. The composition (e.g., the nitrogen) of the adsorption material may facilitate improved adsorption and selectivity of the carbon-carbon composite sorbent to $CO_2$ relative to nitrogen gas. Since the adsorption material overlies surfaces of the base material, the carbon-carbon composite sorbent may be formed to exhibit an improved $CO_2$ capacity with less overall nitrogen compared to other carbon-carbon composite sorbent. In addition, the carbon-carbon composite sorbent may have a relatively high bulk density (e.g., higher than about 0.50 $g/cm^3$), facilitating an increased $CO_2$ capacity of the carbon-carbon composite sorbent per volume compared to conventional carbon sorbents. Further, the base material includes a less expensive material that may be commercially available, reducing the overall cost of manufacturing the carbon-carbon composite sorbent, while also having the same or improved $CO_2$ adsorption capacity compared to other carbon sorbent materials. The carbon-carbon composite sorbent may be formed with fewer processing acts (e.g., without extrusion, with fewer heating acts) since the carbon-carbon composite sorbent is formed using the porous carbon material, which may have been previously formed.

FIG. 1 is a simplified schematic illustrating a system 100 for forming a carbon-carbon composite sorbent 124, according to at least one embodiment of the disclosure. With reference to FIG. 1, the system 100 includes a mixer 102 configured to receive a feed material 104, a porous carbon material 105, and an aqueous material 106. The mixer 102 may be configured to mix the components of the feed material 104, the porous carbon material 105, and the aqueous material 106 to form a mixture 107.

The porous carbon material 105 may include a mesoporous carbon material. In some embodiments, the porous carbon material 105 includes an activated carbon material (e.g., activated charcoal), carbon black, or another carbon material. In some embodiments, the porous carbon material 105 includes activated carbon, such as steam activated carbon. The porous carbon material 105 may include a substantially homogeneous mixture of a mesoporous carbon material, or a mixture of two or more different types of mesoporous carbon materials (e.g., having one or more of different compositions, different forms, different sizes, different particle size distributions, or combinations thereof).

The porous carbon material 105 may be in pellet, powder, or granular form. The activated carbon may include a mixture of one or more of pellets, a granular material, a powder material, or combinations thereof. In some embodiments, the porous carbon material 105 includes granular activated carbon (GAC). In some embodiments, the porous carbon material 105 includes powder activated carbon (PAC).

The porous carbon material 105 may have a particle size distribution such that a median particle size of the porous carbon material 105 is within a range of from about 0.20 mm to about 1.70 mm, such as from about 0.20 mm to about 0.40 mm, from about 0.40 mm to about 0.60 mm, from about 0.60 mm to about 0.80 mm, from about 0.80 mm to about 1.00 mm, or from about 1.00 mm to about 1.70 mm. In some embodiments, the porous carbon material 105 has a particle size distribution such that less than about 5 percent of the porous carbon material 105 passes through a mesh having a diameter of about 0.400 mm (a 40 mesh) and less than about 5 percent of the porous carbon material 105 passes through a mesh having a diameter of about 4.00 mm (a 5 mesh). In other embodiments, the porous carbon material 105 has a particle size distribution such that less than about 5 percent of the porous carbon material 105 passes through a mesh having a diameter of about 0.400 mm (a 40 mesh) and less than about 10 weight percent of the porous carbon material 105 passes through a mesh having a diameter of about 0.841 mm (a 20 mesh). In some embodiments, the particle size distribution of the porous carbon material 105 is between about 0.400 mm and about 1.70 mm (a 12 mesh). In other words, more than about 90 percent of the porous carbon material 105 may pass through an opening having a size within a range of from about 0.400 mm to about 1.70 mm. However, the disclosure is not so limited, and the average particle size and the particle size distribution of the porous carbon material 105 may be different than that described.

Figure 2:
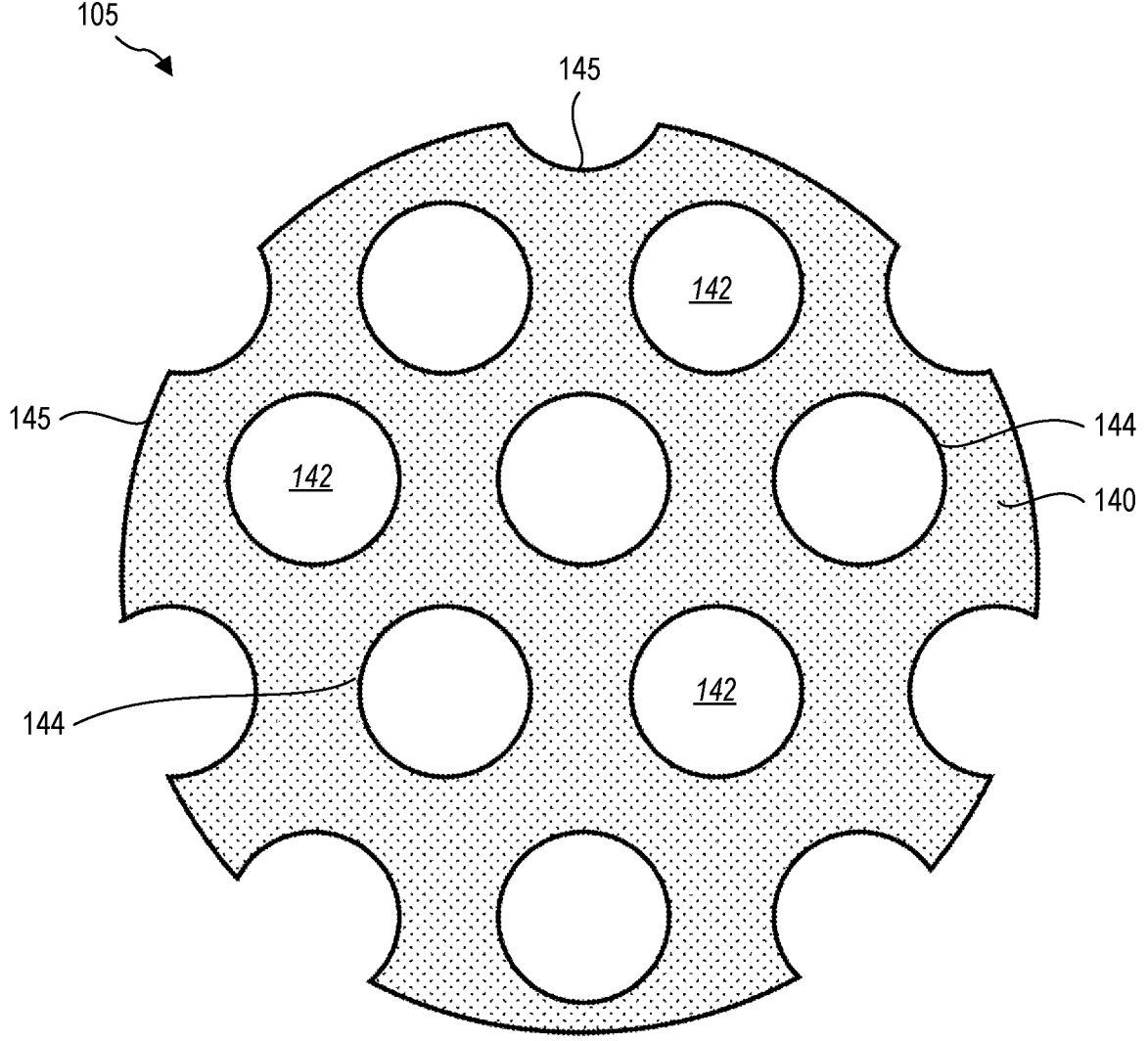
FIG. 2 is a simplified schematic cross-sectional view of a porous carbon material used to form the carbon-carbon composite sorbent, in accordance with embodiments of the disclosure.

FIG. 2 is a simplified cross-sectional view schematically illustrating a portion of the porous carbon material 105. The porous carbon material 105 includes a base material 140 (also referred to as a "bulk structure" or "bulk material") having surfaces 144 defining pores 142 and external surfaces 145. The surfaces 144 defining the pores 142 and the external surfaces 145 are collectively referred to herein as "surfaces 144, 145". The surfaces 144 defining the pores 142 may be referred to as "interior surfaces" of the porous carbon material 105, even though such surfaces 144 may be contacted by gases when the porous carbon material 105 is exposed to gases. The surfaces 144, 145 may include surfaces that are exposed to gases, such as $CO_2$, when gases are flowed across and/or through the porous carbon material 105.

The base material 140 may be formed of and include carbon, such as activated carbon. The base material 140 may include less than about 0.5 atomic percent nitrogen, such as less than about 0.3 atomic percent nitrogen, less than about 0.2 atomic percent nitrogen, or less than about 0.1 atomic percent nitrogen. In some embodiments, the base material 140 is substantially free of nitrogen. In some embodiments, the base material 140 includes carbon ring structures covalently bonded to one another. The base material 140 may include oxygen covalently bonded to the carbon. In some embodiments, the base material 140 includes less than about 1.0 atomic percent of at least one of (e.g., each of) nitrogen, sulfur, phosphorous, and hydrogen.

While FIG. 2 illustrates that the porous carbon material 105 exhibits substantially uniform pores 142, the disclosure is not so limited. In other embodiments, the size and spacing of the pores 142 is non-uniform. At least some of the pores 142 may extend through the bulk of the porous carbon material 105 such that gases and other materials may flow through and contact the surfaces 144 defining the pores 142. In addition, the porous carbon material 105 may exhibit a porosity such that the porous carbon material 105 exhibits a surface area within a range of from about 400 m²/g to about 2,500 m²/g.

With reference back to FIG. 1, the feed material 104 may include one or more carbohydrates (e.g., one or more sugars), a nitrogen-containing material, and optionally, a processing aid. In some embodiments, the feed material 104 includes starch. The one or more carbohydrates may include one or more of a monosaccharide (e.g., one or more of glucose, fructose, or galactose; also referred to as a "hexose" having the formula $C_6H_{12}O_6$), a disaccharide (e.g., one or more of sucrose, lactose, or maltose), or a polysaccharide. In some embodiments, the one or more carbohydrates includes sucrose.

The nitrogen-containing material may include one or more of an amino acid (e.g., glycine), melamine, urea, nitro-aromatic compounds (e.g., nitrophenols), heteroamines (e.g., a triazole, niacin), azo compounds (e.g., 4,4'-azobis(4-cyanopentanoic acid)), ammonium bicarbonate, an amine bicarbonate, ammonium sulfate, ammonium bisulfate, an amine sulfate, an amine bisulfate, ammonium phosphate dibasic, ammonium phosphate, cetyltrimethylammonium bromide, ammonium citrate, ammonium oxalate, ammonium formate, ammonium hydrogen citrate, ammonium hydrogen oxalate, ammonium chloride, ammonium bromide, guanidine carbonate, thiourea, ammonium thiocyanate, or combinations thereof. In some embodiments, the nitrogen-containing material includes one or more amino acids, such as one or more of glycine, alanine, arginine, asparagine, aspartic acid, cysteine, glutamic acid, glutamine, histidine, isoleucine, leucine, lysine (e.g., lysine hydrochloride), methionine, phenylalanine, proline, serine, threonine, tryptophan, tyrosine, valine, or combinations thereof. In some embodiments, the nitrogen-containing material includes, consists essentially of, or consists of one or more amino acids. In some embodiments, the nitrogen-containing material includes, consists essentially of, or consists of guanidine carbonate.

In some embodiments, the nitrogen-containing material compound includes (e.g., comprises, consists essentially of, consists of) one or more of a non-polar amino acid (e.g., one or more of glycine, methionine, or valine), lysine, a hydroxy amino acid (e.g., threonine), a sulfur-containing material (e.g., methionine, thiourea, or ammonium thiocyanate), or a phosphorous-containing material (e.g., ammonium phosphate dibasic, ammonium phosphate). In some embodiments, the nitrogen-containing material includes one or more amine groups bonded to a carboxyl group (e.g., a —COOH group) either directly or through an R group (e.g., an organyl group, such as an acyl group, an alkyl group, or another organic group). In some embodiments, the feed material 104 further includes a sulfur-containing material, such as one or more of ammonium sulfate, ammonium bisulfate, an amine sulfate, an amine bisulfate, methionine, thiourea, ammonium thiocyanate, another sulfur-containing material, or combinations thereof. In some embodiments, the feed material 104 further includes a phosphorous-containing material, such as one or more of ammonium phosphate dibasic and/or ammonium phosphate.

The nitrogen-containing material may affect one or more of the nitrogen content of an adsorption material formed on the surfaces 144, 145 of the porous carbon material 105, the type of nitrogen bonds of the adsorption material (e.g., whether the adsorption material includes pyridones, pyrroles, pyridines, and/or pyrones), the $CO_2$ capacity of the carbon-carbon composite sorbent, or the selectivity of the carbon-carbon composite sorbent to $CO_2$ relative to other materials (e.g., water, nitrogen, oxygen).

The processing aid may be formulated and configured to facilitate lubrication and binding of the materials in the feed material 104. In some embodiments, the processing aid includes a binder. The processing aid may include one or more of a sugar solution, a thermoplastic elastomer (such as a polyether block amine (a copolymer formed from polyether and polyamide), such as Pebax® commercially available from Arkema of Colombes France), carboxymethylcellulose (CMC), methyl cellulose, hydroxypropyl methylcellulose (HPMC), a hydrocarbon, a fluorocarbon, a stearate, another processing aid, or combinations thereof. In some embodiments, the processing aid includes a polyether block amine.

A weight percent of the one or more carbohydrates in the feed material 104 may be within a range of from about 30 weight percent to about 80 weight percent, such as from about 30 weight percent to about 40 weight percent, from about 40 weight percent to about 50 weight percent, from about 50 weight percent to about 60 weight percent, from about 60 weight percent to about 70 weight percent, or from about 70 weight percent to about 80 weight percent. In some embodiments, a weight percent of the one or more carbohydrates in the feed material 104 is within a range of from about 30 weight percent to about 40 weight percent, such as from about 35 weight percent to about 40 weight percent.

A weight percent of the nitrogen-containing material in the feed material 104 may be within a range of from about 2.0 weight percent to about 55.0 weight percent, such as from about 2.0 weight percent to about 3.0 weight percent, from about 3.0 weight percent to about 4.0 weight percent, from about 4.0 weight percent to about 5.0 weight percent, from about 5.0 weight percent to about 6.0 weight percent, from about 6.0 weight percent to about 8.0 weight percent, from about 8.0 weight percent to about 10.0 weight percent, from about 10.0 weight percent to about 20.0 weight percent, from about 20.0 weight percent to about 30.0 weight percent, from about 30.0 weight percent to about 40.0 weight percent, or from about 40.0 weight percent to about 55.0 weight percent.

A weight percent of the processing aid in the feed material 104 may be within a range of from about 1.0 weight percent to about 5.0 weight percent, such as from about 1.0 weight percent to about 2.0 weight percent, from about 2.0 weight percent to about 3.0 weight percent, from about 3.0 weight percent to about 4.0 weight percent, or from about 4.0 weight percent to about 5.0 weight percent.

The aqueous material 106 may include, for example, water. In some embodiments, the aqueous material 106 includes one or more acids formulated and configured to facilitate acid hydrolysis of the one or more carbohydrates in the feed material 104, such as when the one or more carbohydrates includes a disaccharide (e.g., sucrose, lactose, maltose) or a polysaccharide. The one or more acids may include sulfuric acid. The acid may facilitate acid hydrolysis of the carbohydrates to one or more hexoses (e.g., glucose and fructose). The one or more acids may further hydrolyze the one or more hexoses to form 5-hydroxymethylfurfural, levulinic acid, formic acid, and water.

A weight percent of the porous carbon material 105 in the mixture 107 may be within a range of from about 25.0 weight percent to about 80.0 weight percent, such as from about 25.0 weight percent to about 30.0 weight percent, from about 30.0 weight percent to about 40.0 weight percent, from about 40.0 weight percent to about 50.0 weight percent, from about 50.0 weight percent to about 60.0 weight percent, from about 60.0 weight percent to about 70.0 weight percent, or from about 70.0 weight percent to about 80.0 weight percent. In some embodiments, the porous carbon material 105 constitutes greater than about 25.0 weight percent of the mixture 107.

A weight percent of the feed material 104 in the mixture 107 may be within a range of from about 20.0 weight percent to about 40.0 weight percent, such as from about 20.0 weight percent to about 25.0 weight percent, from about 25.0 weight percent to about 30.0 weight percent, from about 30.0 weight percent to about 35.0 weight percent, or from about 35.0 weight percent to about 40.0 weight percent. A weight percent of the aqueous material 106 in the mixture 107 may be within a range of from about 20.0 weight percent to about 35.0 weight percent, such as from about 20.0 weight percent to about 25.0 weight percent, from about 25.0 weight percent to about 30.0 weight percent, or from about 30.0 weight percent to about 35.0 weight percent. However, the disclosure is not so limited, and the weight percent of each of the feed material 104 and the aqueous material 106 in the mixture 107 may be different than that described.

In some embodiments, a weight percent of the nitrogen-containing material in the mixture 107 is within a range of from about 10.0 weight percent to about 35.0 weight percent, such as from about 10.0 weight percent to about 15.0 weight percent, from about 15.0 weight percent to about 20.0 weight percent, from about 20.0 weight percent to about 25.0 weight percent, from about 25.0 weight percent to about 30.0 weight percent, or from about 30.0 weight percent to about 35.0 weight percent. In some embodiments, a weight percent of the nitrogen-containing material in the mixture 107 is less than the weight percent of the porous carbon material 105 in the mixture 107. However, the disclosure is not so limited, and the weight percent of the nitrogen-containing material in the mixture 107 may be different than that described.

A weight percent of the one or more carbohydrates in the mixture 107 may be within a range of from about 15.0 weight percent to about 40.0 weight percent, such as from about 15.0 weight percent to about 20.0 weight percent, from about 20.0 weight percent to about 25.0 weight percent, from about 25.0 weight percent to about 30.0 weight percent, from about 30.0 weight percent to about 35.0 weight percent, or from about 35.0 weight percent to about 40.0 weight percent. In some embodiments, a weight percent of the one or more carbohydrates in the mixture 107 is less than the weight percent of the porous carbon material 105 in the mixture 107.

Although the system 100 has been described and illustrated as including the feed material 104 including each of the one or more carbohydrates, the nitrogen-containing material, and the processing aid, the disclosure is not so limited. In some embodiments, one or more of (e.g., each of) the one or more carbohydrates, the nitrogen-containing material, and the processing aid may be provided to the mixer 102 separately. In addition, while the porous carbon material 105 is described and illustrated as being provided to the mixer 102 separate from the feed material 104, in other embodiments, the porous carbon material 105 and the feed material 104 are provided to the mixer 102 together.

Figure 3:
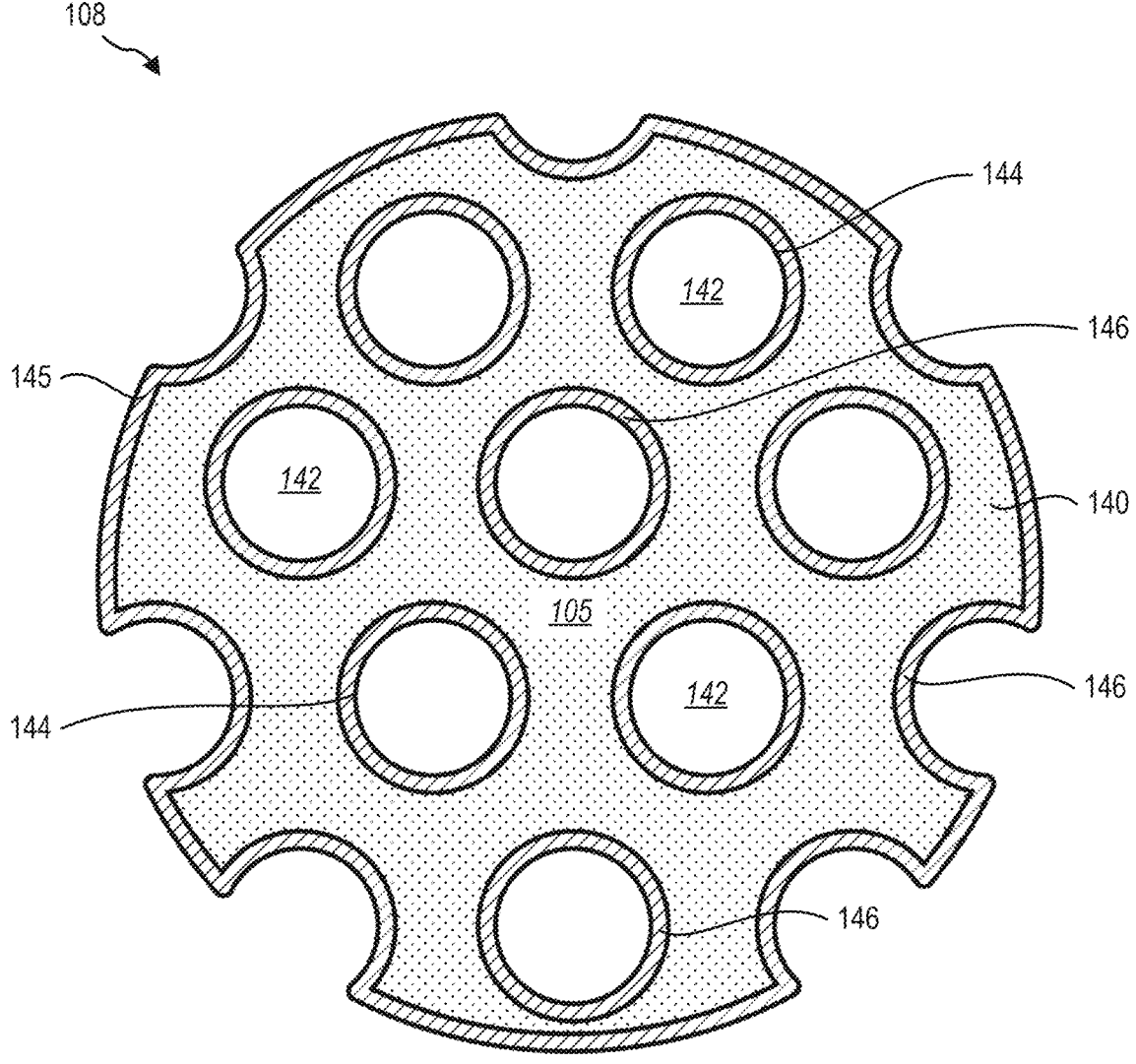
FIG. 3 is a simplified schematic cross-sectional view of a coated porous carbon material, in accordance with embodiments of the disclosure.

In the mixer 102, the feed material 104 and the aqueous material 106 may enter (e.g., infiltrate, impregnate) the pores 142 of the porous carbon material 105 and coat the surfaces 144, 145 of the porous carbon material 105 to form a coated porous carbon material 108. The porous carbon material 105 may act as a backbone (e.g., a scaffolding, a skeleton) on which the coating material 146 is formed. FIG. 3 is a simplified cross-sectional view schematically illustrating the coated porous carbon material 108. The coated porous carbon material 108 includes the base material 140 including the bulk porous carbon material 105 and a coating material 146 on the surfaces 144 of the pores 142 and external surfaces 145 of the base material 140.

Referring again to FIG. 1, in some embodiments, the system 100 optionally includes an extruder 110 (illustrated in a dashed box to indicate the extruder 110 is optional). The extruder 110 may include a single screw extruder, a twin-screw extruder, or another type of extruder. Where the porous carbon material 105 is in powder or granular form, the system 100 may include the extruder 110 if forming the carbon-carbon composite sorbent 124 in pellet form. In some embodiments, the system 100 does not include the extruder 110 and the coated porous carbon material 108 is not extruded. In some such embodiments, the system 100 is configured to form the coated porous carbon material 108 and the carbon-carbon composite sorbent 124 without extrusion. Stated another way, the coated porous carbon material 108 and the carbon-carbon composite sorbent 124 may be formed without extrusion. For example, since the porous carbon material 105 may exhibit a desired size, shape, and structure (e.g., skeleton structure) on which the coating material 146 may be formed, the coated porous carbon material 108 and the carbon-carbon composite sorbent 124 may be formed without extrusion to form the respective coated porous carbon material 108 and the carbon-carbon composite sorbent 124 into a desired size or shape.

If the system 100 includes the extruder 110, the extruder 110 may form pellets of the coated porous carbon material 108. The pellets of the coated porous carbon material 108 may be cylindrical, spherical, or any other shape. A dimension (e.g., a diameter) of the pellets may be within a range of from about 0.80 mm (about 0.03125 inch) to about 3.175 mm (about 0.125 inch), such as from about 0.80 mm (about 0.03125 inch) to about 1.588 mm (about 0.0625 inch), or from about 1.588 mm (about 0.0625 inch) to about 3.175 mm (about 0.125 inch).

The coated porous carbon material 108 may be provided to an oven 114 (e.g., a drying oven) as pellets, in powder form, or in granular form. The coated porous carbon material 108 may be exposed to air 116 in the oven 114 to at least partially dry the coated porous carbon material 108 and form dried coated porous carbon 118. The oven 114 may heat the coated porous carbon material 108 to a temperature sufficient to initiate reaction between the components of the coating material 146 and form the dried coated porous carbon 118. In some embodiments, responsive to exposure to the temperature in the oven 114, the components of the feed material 104 may react with each other. For example, at a temperature above about 100° C., the one or more carbohydrates and the nitrogen-containing material of the coating material 146 may react with each other. In some embodiments, one or more components of the feed material 104 (e.g., the one or more carbohydrates) and an acid (e.g., from the aqueous material 106) react to form 5-hydroxymethylfurfural and levulinic acid. After reacting, the nitrogen-containing material may be dispersed substantially uniformly through the coating material 146. In some embodiments, the nitrogen-containing material in the feed material 104 reacts with the one or more carbohydrates and/or the reacted 5-hydroxymethylfurfural and levulinic acid. Accordingly, in some embodiments, the coating material 146 includes a reaction product of the one or more components of the feed material 104 and, optionally, of the aqueous material 106. In some embodiments, the coating material 146 includes one or more of (e.g., each of) nitrogen from the nitrogen-containing material covalently bonded to carbon atoms of the one or more carbohydrates, 5-hydroxymethylfurfural, or levulinic acid.

In some embodiments, substantially all (e.g., greater than 95%, greater than 99%, greater than 99.9%, greater than 99.99%) of the water is removed from the coated porous carbon material 108 and the dried coated porous carbon 118 is substantially free of water. Evaporation of the water from the coated porous carbon material 108 may facilitate a substantially homogeneous distribution of the nitrogen-containing materials in the coating material 146 (FIG. 3) on surfaces 144, 145 of the base material 140. In other words, the coating material 146 on the coated porous carbon material 108 may include a substantially homogeneous nitrogen content.

The temperature of the oven 114 may be within a range of from about 100° C. to about 200° C., such as from about 100° C. to about 120° C., from about 120° C. to about 140° C., from about 140° C. to about 160° C., from about 160° C. to about 180° C., or from about 180° C. to about 200° C. However, the disclosure is not so limited, and the temperature of the oven 114 may be different than that described.

Responsive to forming the dried coated porous carbon 118, the dried coated porous carbon 118 is provided to a furnace 120, where the dried coated porous carbon 118 is exposed to an inert stream 122 and heated to a temperature higher than the temperature of the oven 114 to form the carbon-carbon composite sorbent 124 (which may also be referred to as "carbon-carbon composite pellets" or "carbonized carbon-carbon composite pellets" if the carbon-carbon composite sorbent 124 is in pellet form) and volatile materials 126. The temperature of the furnace 120 may be within a range of from about 600° C. to about 950° C., such as from about 600° C. to about 700° C., from about 700° C. to about 800° C., from about 800° C. to about 900° C., or from about 900° C. to about 950° C. The furnace 120 may include a rotary furnace (also referred to as a "rotary kiln"), a continuous furnace, a shaft furnace, or another type of furnace. In some embodiments, the furnace 120 includes a rotary furnace.

Although the system 100 has been described and illustrated as including the oven 114, in other embodiments, the system 100 may not include the oven 114. In some such embodiments, the coated porous carbon material 108 may be provided to the furnace 120 directly from the extruder 110 or the mixer 102. In some embodiments, the carbon-carbon composite sorbent 124 may be formed without the oven 114 and by exposing the coated porous carbon material 108 an elevated temperature in only one furnace (e.g., the furnace 120) to carbonize the coating material 146 and form the carbon-carbon composite sorbent 124.

The inert stream 122 may be substantially free of oxygen. In some embodiments, the inert stream 122 is substantially free of an oxidizer. In some embodiments, the inert stream 122 includes an anoxic material (e.g., the inert stream 122 is substantially free of oxygen, such as oxygen gas ($O_2$)). In some embodiments, the inert stream 122 include a reducing gas, such as hydrogen ($H_2$). The inert stream 122 may include, for example, nitrogen gas, argon, helium, hydrogen, or combinations thereof. In some embodiments, the inert stream 122 includes nitrogen.

The volatile materials 126 may include volatile hydrocarbons and at least some decomposition products of the dried coated porous carbon 118 that are vaporized in the furnace 120. In some embodiments, the volatile materials 126 include volatile hydrocarbons and decomposition products of the coating material 146 (FIG. 3). By way of non-limiting example, the volatile materials 126 may include volatile organic compounds (VOCs), $CO_2$, methane, formic acid, or other organic materials exhibiting a relatively low vapor pressure.

In some embodiments, the volatile materials 126 are provided to a combustor 128 where the volatile materials 126 are mixed with air 130 or another oxidizer to form combustion products 132. The combustion products 132 may include, for example, $CO_2$ and water.

With continued reference to FIG. 1, responsive to exposure to the temperature in the furnace 120, the dried coated porous carbon 118 may be carbonized to form the carbon-carbon composite sorbent 124 including an adsorption material having a first composition including at least carbon and nitrogen on surfaces of a porous carbon material (e.g., a mesoporous carbon material, the base material 140).

Figure 4:
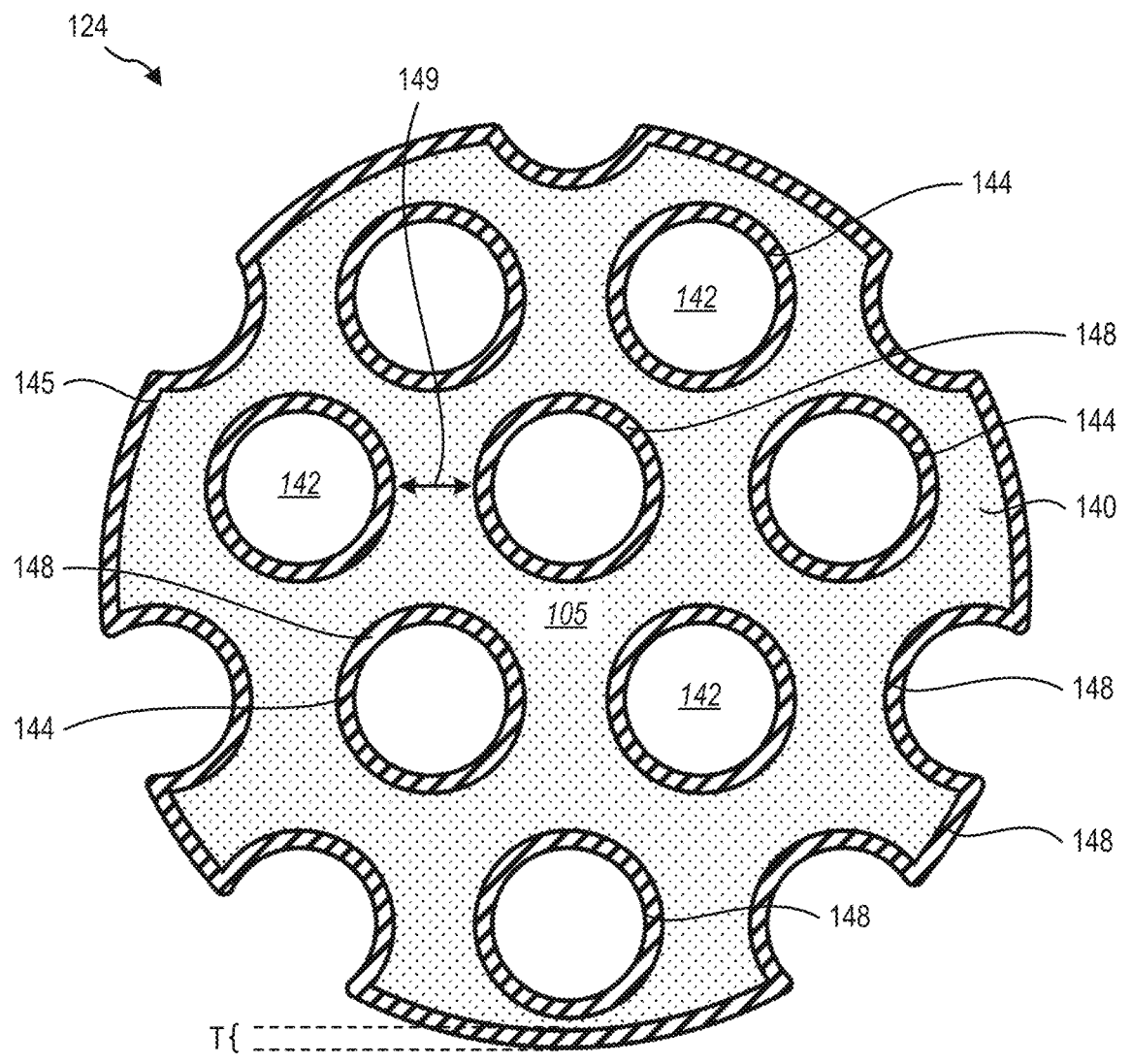
FIG. 4 is a simplified schematic cross-sectional view of a carbon-carbon composite sorbent material, in accordance with embodiments of the disclosure.

FIG. 4 is a simplified cross-sectional view schematically illustrating a portion of the carbon-carbon composite sorbent 124, according to at least one embodiment of the disclosure. The carbon-carbon composite sorbent 124 may include the base material 140 of the porous carbon material 105. The carbon-carbon composite sorbent 124 may include pores 142 defined by surfaces 144, as described above with reference to the porous carbon material 105 and the coated porous carbon material 108. The surfaces 144 defining the pores 142, as well as external surfaces 145 of the base material 140, may be coated with an adsorption material 148. A percentage of the surfaces 144, 145 that are coated with the adsorption material 148 may be at least about 80%, such as at least about 85%, at least about 90%, at least about 95%, at least about 98%, or even at least about 99%. In some embodiments, substantially all internal and external surfaces of the base material 140 (e.g., the porous carbon material 105) are coated with the adsorption material 148. Stated another way, the adsorption material 148 overlies and contacts external surfaces 145 of the base material 140 and the surfaces 144 defining the pores 142 of the base material 140. The carbon-carbon composite sorbent 124 may include mesoporous carbon and include pores 142 having a diameter within a range of from about 2 nm about 50 nm. In some embodiments, the pores 142 (e.g., at least some of the pores 142, substantially all of the pores 142) are accessible by gases to which the carbon-carbon composite sorbent 124 is exposed. For example, due to the porosity of the porous carbon material 105 from which the carbon-carbon composite sorbent 124 is formed, gases may pass through the pores 142 and contact the surfaces 144 defining the pores 142.

A thickness T of the adsorption material 148 may be less than a thickness or dimension (e.g., diameter) of the base material 140. The thickness T of the adsorption material 148 may be less than a dimension (e.g., a diameter) of the pores 142. In some embodiments, the thickness T of the adsorption material 148 is less than the distance 149 between neighboring portions of the adsorption material 148 (e.g., the distance between portions of the adsorption material 148 on the surfaces 144 of a first pore 142 to the adsorption material 148 on the surfaces 144 of other pores 142 or on external surfaces 145 of the base material 140). In some embodiments, the thickness T of the adsorption material 148 is less than a minimum distance 149 between neighboring portions of the adsorption material 148. In some embodiments, the thickness T of the adsorption material 148 is less than a maximum distance 149 between neighboring portions of the adsorption material 148. By way of non-limiting example, the thickness T of the adsorption material 148 may be within a range of from about 5 Å to about 20 Å, such as from about 5 to about 10, from about 10 to about 15, or from about 15 to about 20. In some embodiments, the adsorption material 148 exhibits a substantially uniform thickness T across surfaces 144, 145 thereof. In other embodiments, the thickness T of the adsorption material 148 is non-uniform.

The carbonization of the dried coated porous carbon 118 may decompose components of the coating material 146 (FIG. 3) on surfaces 144, 145 of the dried coated porous carbon 118 to form the carbon-carbon composite sorbent 124. In some embodiments, the carbon compounds and the nitrogen-containing material in the coating material 146 of the dried coated porous carbon 118 decompose to form the adsorption material 148 including a high purity carbon including nitrogen atoms (from the nitrogen-containing material) covalently bonded to the carbon. In some embodiments, the carbon includes a carbon ring structure.

The adsorption material 148 may be formed of and include products of the carbonization of the coating material 146 (FIG. 3). The composition of the adsorption material 148 may depend, at least in part, on the composition of the feed material 104, such as the nitrogen-containing material and/or the processing aid. In some embodiments, the adsorption material 148 includes a char comprising carbonized reaction products of one or more components of the feed material 104, such as of one or more carbohydrates and the nitrogen-containing material. In some embodiments, the adsorption material 148 includes pyrolysis products of the one or more carbohydrates (and/or acid hydrolysis products of the one or more carbohydrates) and the nitrogen-containing material. In some embodiments, the adsorption material 148 includes carbonized char formed from polymerized 5-hydroxymethylfurfural and levulinic acid and the nitrogen-containing material. Thus, in some embodiments, the one or more carbohydrates and the nitrogen-containing material of the coating material 146 decompose during the carbonization process to form the adsorption material 148 on the surfaces 144, 145.

In some embodiments, the adsorption material 148 exhibits a substantially uniform composition. The material composition of the adsorption material 148 may be different than the material composition of the base material 140 (e.g., the composition of the porous carbon material 105). Since the adsorption material 148 has a different material composition than the base material 140, the carbon-carbon composite sorbent 124 may be referred to herein as a composite structure having a heterogeneous composition or a non-homogeneous composition.

The adsorption material 148 may constitute from about 10.0 weight percent to about 50.0 weight percent of the carbon-carbon composite sorbent 124, such as from about 10.0 weight percent to about 15.0 weight percent, from about 15.0 weight percent to about 20.0 weight percent, from about 20.0 weight percent to about 25.0 weight percent, from about 25.0 weight percent to about 30.0 weight percent, from about 30.0 weight percent to about 40.0 weight percent, or from about 40.0 weight percent to about 50.0 weight percent of the carbon-carbon composite sorbent 124. The base material 140 may constitute from about 50.0 weight percent to about 90.0 weight percent of the carbon-carbon composite sorbent 124, such as from about 50.0 weight percent to about 60.0 weight percent, from about 60.0 weight percent to about 70.0 weight percent, from about 70.0 weight percent to about 75.0 weight percent, from about 75.0 weight percent to about 80.0 weight percent, from about 80.0 weight percent to about 85.0 weight percent, or from about 85.0 weight percent to about 90.0 weight percent of the carbon-carbon composite sorbent 124. A ratio of the base material 140 to the adsorption material 148 in the carbon-carbon composite sorbent 124 may be within a range of from about 1.0:1.0 to about 8.0:1.0, such as from about 1.0:1.0 to about 2.0:1.0, from about 2.0:1.0 to about 3.0:1.0, from about 3.0:1.0 to about 4.0:1.0, from about 4.0:1.0 to about 5.0:1.0, from about 5.0:1.0 to about 6.0:1.0, from about 6.0:1.0 to about 7.0:1.0, or from about 7.0:1.0 to about 8.0:1.0. However, the disclosure is not so limited, and the ratio of the base material 140 to the adsorption material 148 may be different depending, at least in part, on the weight percent of each of the feed material 104 and the porous carbon material 105 in the mixture 107.

As described above, the adsorption material 148 may include carbon atoms covalently bonded to other carbon atoms in ring structures and may further include nitrogen atoms covalently bonded to carbon atoms of the carbon ring structures. In some embodiments, the adsorption material 148 comprises, consists essentially of, or consists of carbon atoms, nitrogen atoms, and oxygen atoms. In some embodiments, the adsorption material 148 is substantially free of sulfur and phosphorous. In other embodiments, the adsorption material 148 includes at least one of (e.g., both of) sulfur or phosphorous.

Figure 5A:
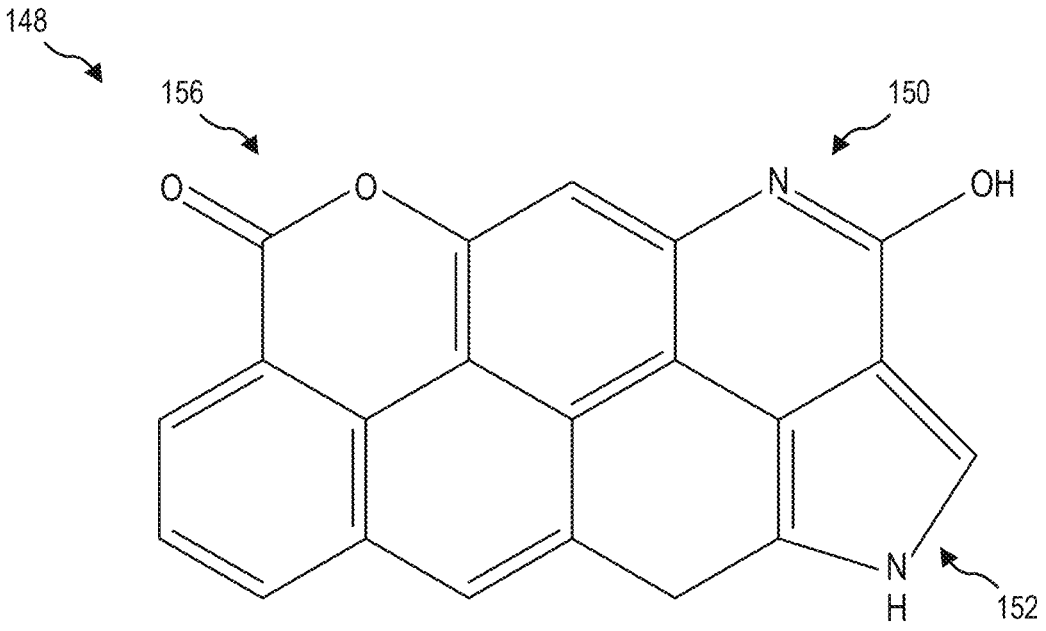
FIG. 5A and FIG. 5B are simplified schematics of a structure of an adsorption material on surfaces of carbon-carbon composite sorbents, according to at least one embodiment of the disclosure.
Figure 5B:
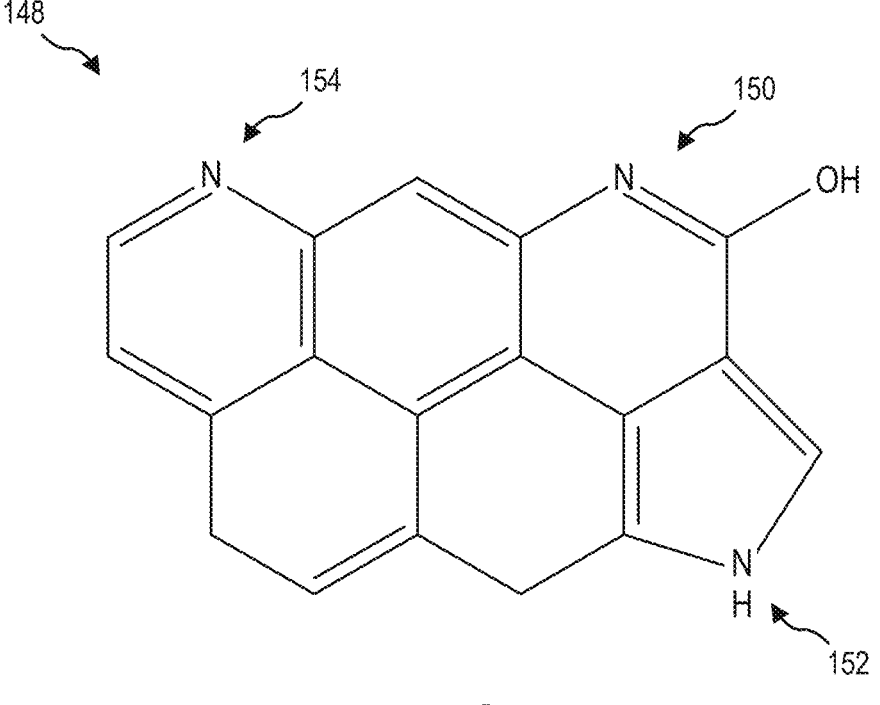

FIG. 5A and FIG. 5B are simplified schematic illustrations of the structure of the adsorption material 148, in accordance with at least one embodiment of the disclosure. The adsorption material 148 may include carbon atoms covalently bonded to other carbon atoms, nitrogen atoms, and/or oxygen atoms. In addition, the adsorption material 148 may include nitrogen atoms covalently bonded to carbon atoms, oxygen atoms, or both. In some embodiments, the adsorption material 148 includes one or more of (e.g., each of) carbon to carbon single bonds (C—C bonds), carbon to oxygen single bonds (C—O bonds), carbon to nitrogen single bonds (C—N bonds), carbon to oxygen double bonds (C═O bonds) wherein the carbon atom is also single bonded to another oxygen or a nitrogen atoms (e.g., O—C—O bonds and/or N—C—O bonds), pyridine groups, pyrrole groups, pyrone groups, lactone groups, or combinations thereof. For example, with combined reference to FIG. 5A and FIG. 5B, the adsorption material 148 may include pyridone groups or pyridone like structures 150, pyrrole groups 152, pyridine groups 154, and pyrone groups 156. In some embodiments, the adsorption material 148 includes each of pyridone groups or pyridone like structures, pyrrole groups, pyridine groups, pyrone groups, and lactone groups. In some embodiments, at least some of the carbon atoms of the adsorption material 148 are conjugated and include of $\pi$-$\pi$* bonds.

Figure 6:
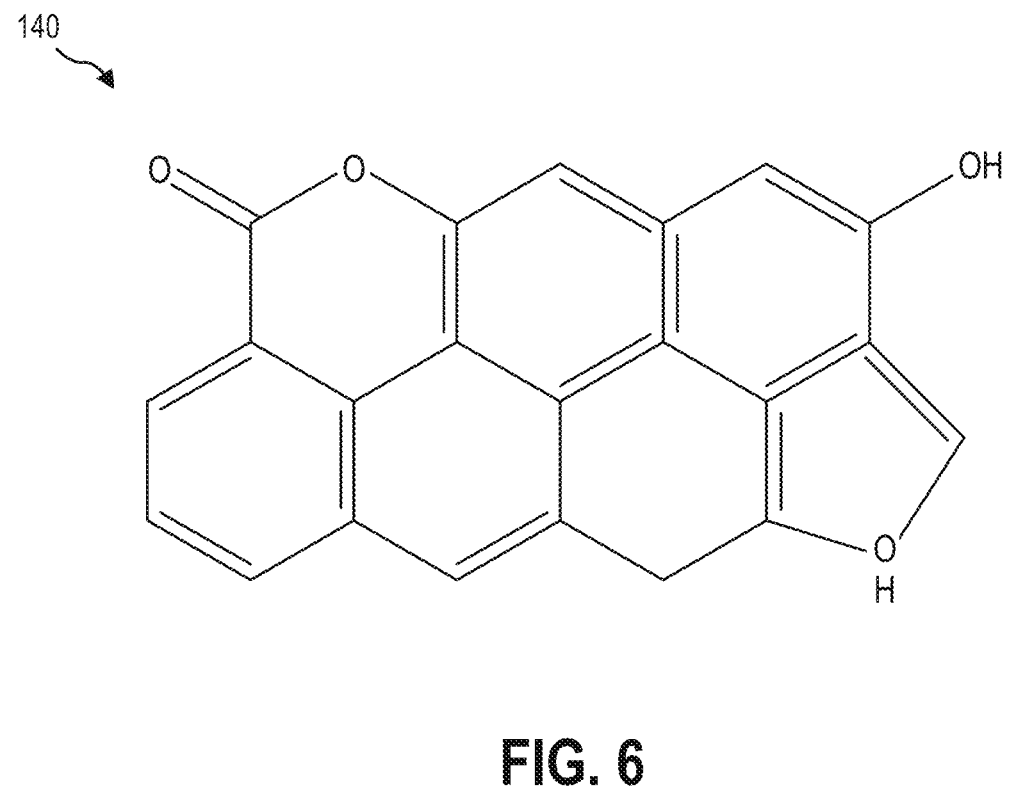

FIG. 6 is a simplified schematic illustration of the structure of the base material 140 of the carbon-carbon composite sorbent 124. The base material 140 may include a network of covalently bonded carbon. In some embodiments, the base material 140 includes carbon ring structures. The base material 140 may include some oxygen atoms covalently bonded to the carbon atoms. In some embodiments, the base material 140 is substantially free of nitrogen atoms and does not include, for example, pyridone groups or pyridone like structures 150, pyrrole groups 152, pyridine groups 154, and pyrone groups 156. In some embodiments, the base material 140 is substantially free of sulfur and phosphorous.

With collective reference to FIG. 5A through FIG. 6, the base material 140 may include a different material composition than the adsorption material 148 and the carbon-carbon composite sorbent 124 may exhibit a substantially non-homogeneous composition. In some embodiments, an atomic percent of one or more of (e.g., each of) nitrogen, oxygen, carbon, sulfur, phosphorous, and hydrogen in the carbon-carbon composite sorbent 124 may be non-uniform.

In some embodiments, an atomic percent of nitrogen atoms that are part of one or more of a pyridone structure, a pyrrole structure, or a pyridine structure may be non-uniform (e.g., greater at the adsorption material 148 than at the base material 140).

A carbon content of the adsorption material 148, exclusive of hydrogen atoms in the adsorption material 148, may be within a range of from about 85.0 atomic percent to about 95.0 atomic percent, such as from about 85.0 atomic percent to about 87.0 atomic percent, from about 87.0 atomic percent to about 89.0 atomic percent, from about 89.0 atomic percent to about 91.0 atomic percent, from about 91.0 atomic percent to about 93.0 atomic percent, or from about 93.0 atomic percent to about 95.0 atomic percent. However, the disclosure is not so limited, and the carbon content at the surface of the adsorption material 148 may be different than that described.

The carbon content of the adsorption material 148 may be less than the carbon content of the base material 140. The carbon content of the base material 140 may be within a range of from about 93.0 atomic percent to about 99.0 atomic percent, such as from about 93.0 atomic percent to about 95.0 atomic percent, from about 95.0 atomic percent to about 97.0 atomic percent, or from about 97.0 atomic percent to about 99.0 atomic percent.

An oxygen content of the adsorption material 148, exclusive of hydrogen atoms in the adsorption material 148, may be within a range of from about 2.0 atomic percent to about 8.0 atomic percent, such as from about 2.0 atomic percent to about 3.0 atomic percent, from about 3.0 atomic percent to about 4.0 atomic percent, from about 4.0 atomic percent to about 5.0 atomic percent, from about 5.0 atomic percent to about 6.0 atomic percent, from about 6.0 atomic percent to about 7.0 atomic percent, or from about 7.0 atomic percent to about 8.0 atomic percent. In some embodiments, the oxygen content of the adsorption material 148 is greater than the oxygen content of the base material 140. The oxygen content of the base material 140 may be within a range of from about 1.0 atomic percent to about 5.0 atomic percent, such as from about 1.0 atomic percent to about 3.0 atomic percent, or from about 3.0 atomic percent to about 5.0 atomic percent.

A nitrogen content of the adsorption material 148, exclusive of hydrogen atoms in the adsorption material 148, may be within a range of from about 2.0 atomic percent to about 10.0 atomic percent, such as from about 2.0 atomic percent to about 3.0 atomic percent, from about 3.0 atomic percent to about 5.0 atomic percent, from about 5.0 atomic percent to about 6.0 atomic percent, from about 6.0 atomic percent to about 7.0 atomic percent, from about 7.0 atomic percent to about 8.0 atomic percent, from about 8.0 atomic percent to about 9.0 atomic percent, or from about 9.0 atomic percent to about 10.0 atomic percent. In some embodiments, a nitrogen content of the adsorption material 148 is greater than about 2.0 atomic percent, such as greater than about 4.0 atomic percent, greater than about 5.0 atomic percent, greater than about 6.0 atomic percent, greater than about 7.0 atomic percent, or greater than about 8.0 atomic percent. The adsorption material 148 may have a greater nitrogen content than the base material 140. The base material 140 may include a nitrogen content of less than about 2.0 atomic percent, such as less than about 1.5 atomic percent, less than about 1.0 atomic percent, or less than about 0.5 atomic percent.

In some embodiments, a ratio of the combination of pyridone groups and pyrrole groups to pyridine groups (e.g., the ratio of pyridone/pyrrole to pyridine) in the adsorption material 148 may be within a range of from about 0.5:1.0 to about 3.0:1.0, such as from about 0.5:1.0 to about 1.0:1.0, from about 1.0:1.0 to about 1.5:1.0, from about 1.5:1.0 to about 2.0:1.0, from about 2.0:1.0 to about 2.5:1.0, or from about 2.5:1.0 to about 3.0:1.0. In some embodiments, greater than about 25.0 atomic percent of the nitrogen atoms in the adsorption material 148 are part of pyridine groups; and less than about 75.0 atomic percent of the nitrogen atoms in the adsorption material 148 are part of pyridone groups and/or pyrrole groups. In some embodiments, the base material 140 is substantially free of each of pyridone groups, pyrrole groups, and pyridine groups.

An atomic percent of the carbon atoms in the adsorption material 148 that are single bonded to an oxygen atom and double bonded to an oxygen atom (O—C—O) or that are single bonded to a nitrogen atom and double bonded to an oxygen atom (N—C—O) may be within a range of from about 2.0 atomic percent to about 4.0 atomic percent, such as from about 2.0 atomic percent to about 2.5 atomic percent, from about 2.5 atomic percent to about 3.0 atomic percent, from about 3.0 atomic percent to about 3.5 atomic percent, or from about 3.5 atomic percent to about 4.0 atomic percent. In some embodiments, greater than about 2.5 atomic percent, such as greater than about 3.0 atomic percent of the carbon atoms of the adsorption material 148 are double bonded to an oxygen atom and single bonded to one of another oxygen atom or a nitrogen atom. A lower atomic percent of carbon atoms of the base material 140 may be single bonded to an oxygen atom and double bonded to another oxygen atom than the atomic percent of carbon atoms of the adsorption material 148 that are single bonded to an oxygen atom and either double bonded to another oxygen atom or single bonded to a nitrogen atom.

An atomic percent of carbon atoms in the adsorption material 148 that are double bonded to an oxygen atom (C═O) or double bonded to a nitrogen atom (C═N) may be within a range of from about 6.0 atomic percent to about 10.0 atomic percent of the carbon atoms in the adsorption material 148, such as from about 6.0 atomic percent to about 7.0 atomic percent, from about 7.0 atomic percent to about 8.0 atomic percent, from about 8.0 atomic percent to about 9.0 atomic percent, or from about 9.0 atomic percent to about 10.0 atomic percent of the carbon atoms in the adsorption material 148. The atomic percent of carbon atoms in the adsorption material 148 that are either double bonded to an oxygen atom or double bonded to a nitrogen atom may be greater than about 6.0 atomic percent, such as greater than about 7.0 atomic percent, greater than about 8.0 atomic percent, or greater than about 9.0 atomic percent.

An atomic percent of carbon atoms in the adsorption material 148 that are either single bonded to an oxygen atom (C—O) or single bonded to a nitrogen atom (C—N) may be within a range of from about 10.0 atomic percent to about 30.0 atomic percent, such as from about 10.0 atomic percent to about 15.0 atomic percent, from about 15.0 atomic percent to about 20.0 atomic percent, from about 20.0 atomic percent to about 25.0 atomic percent, or from about 25.0 atomic percent to about 30.0 atomic percent of the carbon atoms in the adsorption material 148. The atomic percent of carbon atoms in the adsorption material 148 that are either single bonded to oxygen or nitrogen may be greater than about 10.0 atomic percent and less than about 30.0 atomic percent.

An atomic percent of carbon atoms in the adsorption material 148 that are either single bonded to a hydrogen atom (C—H) or single bonded to another carbon atom (C—C) may be within a range of from about 50.0 atomic percent to about 75.0 atomic percent, such as from about 50.0 atomic percent to about 55.0 atomic percent, from about 55.0 atomic percent to about 60.0 atomic percent, from about 60.0 atomic percent to about 65.0 atomic percent, from about 65.0 atomic percent to about 70.0 atomic percent, or from about 70.0 atomic percent to about 75.0 atomic percent. The atomic percent of carbon atoms in the adsorption material 148 that are either single bonded to hydrogen or another carbon atom may be greater than about 50.0 atomic percent and less than about 70.0 atomic percent in some embodiments.

An atomic percent of the carbon atoms in the adsorption material 148 that exhibit π-π* conjugation may be within a range of from about 9.0 atomic percent to about 14.0 atomic percent, such as from about 9.0 atomic percent to about 10.0 atomic percent, from about 10.0 atomic percent to about 11.0 atomic percent, from about 11.0 atomic percent to about 12.0 atomic percent, from about 12.0 atomic percent to about 13.0 atomic percent, or from about 13.0 atomic percent to about 14.0 atomic percent. In some embodiments, an atomic percent of the carbon atoms in the adsorption material 148 that exhibit π-π* conjugation may be greater than about 9.0 atomic percent, such as greater than about 10.0 atomic percent.

An atomic percent of nitrogen in the carbon-carbon composite sorbent 124 (including both the base material 140 and the adsorption material 148) may be within a range of from about 0.20 atomic percent to about 1.0 atomic percent, such as from about 0.20 atomic percent to about 0.40 atomic percent, from about 0.40 atomic percent to about 0.60 atomic percent, from about 0.60 atomic percent to about 0.80 atomic percent, or from about 0.80 atomic percent to about 1.0 atomic percent. Since the adsorption material 148 includes a higher atomic percent of nitrogen than the base material 140, and since the amount of nitrogen at the surfaces of the carbon-carbon composite sorbent 124 may affect the $CO_2$ adsorption capacity of the carbon-carbon composite sorbent 124, the carbon-carbon composite sorbent 124 may include a lower amount of nitrogen than a sorbent material having a homogeneous composition for a similar amount of $CO_2$ adsorption capacity.

An atomic percent of the oxygen atoms in the adsorption material 148 that are double bonded to a carbon atom may be within a range of from about 30.0 atomic percent to about 70.0 atomic percent, such as from about 30.0 atomic percent to about 40.0 atomic percent, from about 40.0 atomic percent to about 50.0 atomic percent, from about 50.0 atomic percent to about 60.0 atomic percent, or from about 60.0 atomic percent to about 70.0 atomic percent of the oxygen atoms of the adsorption material 148. In some embodiments, at least about 30.0 atomic percent of the oxygen atoms of the adsorption material 148 are double bonded to a carbon atom, such as at least about 40.0 atomic percent, at least about 50.0 atomic percent, or at least about 60.0 atomic percent of the oxygen atoms at the surface. An atomic percent of the oxygen atoms in the adsorption material 148 that are single bonded to a carbon atom may be within a range of from about 30.0 atomic percent to about 70.0 atomic percent, such as from about 30.0 atomic percent to about 40.0 atomic percent, from about 40.0 atomic percent to about 50.0 atomic percent, from about 50.0 atomic percent to about 60.0 atomic percent, or from about 60.0 atomic percent to about 70.0 atomic percent of the oxygen atoms of the adsorption material 148.

In some embodiments, the adsorption material 148 includes a greater amount of at least one of (e.g., only one of, both of) sulfur or phosphorous than the base material 140. An atomic percent of sulfur in the adsorption material 148, exclusive of hydrogen atoms in the adsorption material 148, may be within a range of from about 0.5 atomic percent to about 2.5 atomic percent, such as from about 0.5 atomic percent to about 1.0 atomic percent, from about 1.0 atomic percent to about 1.5 atomic percent, from about 1.5 atomic percent to about 2.0 atomic percent, or from about 2.0 atomic percent to about 2.5 atomic percent. An atomic percent of phosphorous in the adsorption material 148, exclusive of hydrogen atoms in the adsorption material 148, may be within a range of from about 0.5 atomic percent to about 2.5 atomic percent, such as from about 0.5 atomic percent to about 1.0 atomic percent, from about 1.0 atomic percent to about 1.5 atomic percent, from about 1.5 atomic percent to about 2.0 atomic percent, or from about 2.0 atomic percent to about 2.5 atomic percent.

In some embodiments, the adsorption material 148 includes a greater atomic percent of nitrogen and a lower atomic percent of carbon than the base material 140. The adsorption material 148 may further include a greater atomic percent of oxygen than the base material 140. In addition, in some embodiments, the adsorption material 148 further includes a larger atomic percent of at least one of sulfur or phosphorous than the base material 140. In some embodiments, the adsorption material 148 includes a greater atomic percent of sulfur and/or phosphorous than the base material 140.

While the adsorption material 148 and the base material 140 have been described as having particular compositions, the disclosure is not so limited. In other embodiments, the atomic percent of one or more of carbon, oxygen, nitrogen, sulfur, or phosphorous in the adsorption material 148 and/or the base material 140 may be different than those described.

As described above, the carbon-carbon composite sorbent 124 may exhibit one or more properties beneficial for $CO_2$ capture. In particular, the adsorption material 148 on surfaces 144, 145 of the base material 140 (e.g., on surfaces 144, 145 of the porous carbon material 105) may exhibit one or more properties beneficial for $CO_2$ capture. In some embodiments, the adsorption material 148 may exhibit a relatively higher $CO_2$ capacity and a higher selectivity to $CO_2$ relative to other materials (e.g., $N_2$, $H_2O$) than the base material 140. Since the adsorption material 148 is only on surfaces of the base material 140 and since $CO_2$ adsorption is a surface phenomenon, the $CO_2$ adsorption properties of the carbon-carbon composite sorbent 124 may be affected by the composition of the adsorption material 148. The carbon-carbon composite sorbent 124 may exhibit substantially the same $CO_2$ capacity and selectivity as carbon sorbent pellets including a relatively higher nitrogen content than the carbon-carbon composite sorbent 124. In other words, in some embodiments, the carbon-carbon composite sorbent 124 may exhibit a higher $CO_2$ capacity and selectivity per atomic percent of nitrogen compared to conventional carbon sorbent pellets.

In some embodiments, the chemical composition of the base material 140 may not affect (e.g., may not substantially affect) the $CO_2$ capacity and selectivity of the carbon-carbon composite sorbent 124. However, the structure (e.g., the porosity) of the base material 140 may affect the $CO_2$ capacity and selectivity of the carbon-carbon composite sorbent 124 since the structure of the base material 140 may affect the surface area of the adsorption material 148 overlying surfaces 144 of the base material 140.

The carbon-carbon composite sorbent 124 may be exposed to an activation process to increase a surface area of the adsorption material 148. For example, the carbon-carbon composite sorbent 124 may be exposed to one or more surface activators (e.g., $CO_2$, steam) to form an activated carbon-carbon composite sorbent 124, wherein the adsorption material 148 is surface activated.

A specific surface area of the carbon-carbon composite sorbent 124 may be determined by using Brunauer-Emmett-Teller (BET) surface area analysis. The BET surface area of the carbon-carbon composite sorbent 124 may be within a range of from about 200 $m^2/g$ to about 2,500 $m^2/g$, such as from about 200 $m^2/g$ to about 300 $m^2/g$, from about 300 $m^2/g$ to about 400 $m^2/g$, from about 400 $m^2/g$ to about 700 $m^2/g$, from about 700 $m^2/g$ to about 1,000 $m^2/g$, from about 1,000 $m^2/g$ to about 1,500 $m^2/g$, from about 1,500 $m^2/g$ to about 2,000 $m^2/g$, or from about 2,000 $m^2/g$ to about 2,500 $m^2/g$.

A Barrett-Joyner-Halenda (BJH) pore volume of the carbon-carbon composite sorbent 124 may be within a range of from about 0.060 $cm^3/g$ to about 0.090 $cm^3/g$, such as from about 0.060 $cm^3/g$ to about 0.070 $cm^3/g$, from about 0.070 $cm^3/g$ to about 0.080 $cm^3/g$, or from about 0.080 $cm^3/g$ to about 0.090 $cm^3/g$. In some embodiments, the BJH pore volume includes only the mesopore and small micropore volume of the carbon-carbon composite sorbent 124 and is exclusive of the macropore volume of the carbon-carbon composite sorbent 124. A BJH average pore width of the carbon-carbon composite sorbent 124 may be within a range of from about 4.0 nm to about 7.0 nm, such as from about 4.0 nm to about 5.0 nm, from about 5.0 nm to about 6.0 nm, or from about 6.0 nm to about 7.0 nm. A t-plot micropore volume determined by BJT analysis of the carbon-carbon composite sorbent 124 may be within a range of from about 0.100 $cm^3/g$ to about 0.250 $cm^3/g$, such as from about 0.100 $cm^3/g$ to about 0.150 $cm^3/g$, from about 0.150 $cm^3/g$ to about 0.200 $cm^3/g$, or from about 0.200 $cm^3/g$ to about 0.250 $cm^3/g$. The t-plot micropore volume may be representative of the total volume of the micropores of the carbon-carbon composite sorbent 124 (and may be exclusive of and not include the mesopore volume).

A bulk density of the carbon-carbon composite sorbent 124 may be greater than about 0.50 $g/cm^3$, such as greater than about 0.55 $g/cm^3$, greater than about 0.60 $g/cm^3$, greater than about 0.65 $g/cm^3$, or even greater than about 0.70 $g/cm^3$. In some embodiments, the bulk density of the carbon-carbon composite sorbent 124 is within a range of from about 0.50 $g/cm^3$ to about 0.60 $g/cm^3$, or from about 0.60 $g/cm^3$ to about 0.70 $g/cm^3$.

A $CO_2$ loading capacity (also referred to as a "carbon dioxide capacity") of the carbon-carbon composite sorbent 124 may be measured by exposing the carbon-carbon composite sorbent 124 to a gas stream at different temperatures and partial pressures of $CO_2$.

The $CO_2$ capacity of the carbon-carbon composite sorbent 124 may be measured by exposing the carbon-carbon composite sorbent 124 to a gas stream including 15 volume percent $CO_2$ and 85 volume percent nitrogen at a total pressure of 760 mmHg. Thus, the gas stream included a partial pressure of $CO_2$ of about 114 mmHg and a partial pressure of nitrogen of about 646 mmHg. The $CO_2$ capacity of the carbon-carbon composite sorbent 124 at 60° C. and a partial pressure of $CO_2$ of about 114 mmHg may be within a range of from about 0.75 weight percent to about 1.50 weight percent (meaning that the weight of the carbon-carbon composite sorbent 124 adsorb an amount of $CO_2$ corresponding to from 0.75 weight percent to about 1.50 weight percent of the weight of the carbon-carbon composite sorbent 124; for example, 100 grams of the carbon-carbon composite sorbent 124 may be loaded with from about 0.75 grams to about 1.50 grams of $CO_2$), such as from about 0.75 weight percent to about 1.00 weight percent, from about 1.00 weight percent to about 1.25 weight percent, or from about 1.25 weight percent to about 1.50 weight percent. The $CO_2$ capacity of the carbon-carbon composite sorbent 124 at 60° C. and a $CO_2$ partial pressure of about 114 mmHg may be greater than about 0.75 weight percent, such as greater than about 1.00 weight percent, or greater than about 1.25 weight percent.

The $CO_2$ capacity of the carbon-carbon composite sorbent 124 at 30° C. and a $CO_2$ partial pressure of about 114 mmHg may be within a range of from about 1.50 weight percent to about 3.00 weight percent, such as from about 1.50 weight percent to about 2.00 weight percent, from about 2.00 weight percent to about 2.50 weight percent, or from about 2.50 weight percent to about 3.00 weight percent of the carbon-carbon composite sorbent 124. The $CO_2$ capacity of the carbon-carbon composite sorbent 124 at 30° C. and a $CO_2$ partial pressure of about 114 mmHg may be greater than about 1.50 weight percent, such as greater than about 2.00 weight percent, or greater than about 2.50 weight percent of the carbon-carbon composite sorbent 124.

The carbon-carbon composite sorbent 124 may exhibit an Ideal Adsorption Solution Theory (IAST) selectivity to carbon dioxide relative to nitrogen ($N_2$) at 60° C. greater than about 10.00, such as greater than about 11.00, greater than about 12.00, greater than about 13.00, greater than about 14.00, or greater than about 15.00. In some embodiments, the selectivity of the carbon-carbon composite sorbent 124 to $CO_2$ relative to $N_2$ at 60° C. may be at least about 12.00, such as at least about 13.00, at least about 14.00, or at least about 15.00. As used herein the selectivity of the carbon-carbon composite sorbent 124 to $CO_2$ relative to $N_2$ at a particular temperature includes the ratio of the mole fractions in the adsorbed state (q) of $CO_2$ to $N_2$ at the partial pressure of each of $CO_2$ and $N_2$. For example, the selectivity of the carbon-carbon composite sorbent 124 to $CO_2$ relative to $N_2$ at a particular temperature may be defined according to Equation (1) below:

$$S = \frac{\frac{q_{CO_2}}{P_{CO_2}}}{\frac{q_{N_2}}{P_{N_2}}};$$ (1)

wherein $q_{CO2}$ is the mole fraction of adsorbed $CO_2$ at the particular temperature; $P_{CO2}$ is the partial pressure of $CO_2$ at which the $CO_2$ is adsorbed; $q_{N2}$ is the mole fraction of adsorbed $N_2$ at the particular temperature; and $P_{N2}$ is the partial pressure of $N_2$ at which the $N_2$ is adsorbed. As used herein, the selectivity of carbon-carbon composite sorbent 124 to $CO_2$ relative to $N_2$ is measured with a gas including 15 volume percent $CO_2$ and 85 volume percent $N_2$ at a total pressure of 760 mmHg such that the gas has a partial pressure of $CO_2$ of about 114 mmHg and a partial pressure of $N_2$ of about 646 mmHg.

The selectivity of the carbon-carbon composite sorbent 124 to $CO_2$ relative to $N_2$ at 30° C. (and a partial pressure of $CO_2$ of about 114 mmHg and a partial pressure of $N_2$ of about 646 mmHg) may be within a range of from about 13.00 to about 18.00, such as from about 13.00 to about 15.00, from about 15.00 to about 16.00, from about 16.00 to about 17.00, or from about 17.00 to about 18.00. In some embodiments, the selectivity of the carbon-carbon composite sorbent 124 to $CO_2$ relative to $N_2$ at 30° C. is greater than about 14.00, such as greater than about 15.00, greater than about 16.00, or greater than about 17.00.

At about 0° C. and a relative humidity of about 25 percent, the carbon-carbon composite sorbent 124 may exhibit a water uptake within a range of from about 1.50 weight percent to about 2.50 weight percent of the carbon-carbon composite sorbent 124, such as from about 1.50 weight percent to about 2.00 weight percent, or from about 2.00 weight percent to about 2.50 weight percent of the carbon-carbon composite sorbent 124 when the carbon-carbon composite sorbent is exposed to a stream having a partial pressure of $CO_2$ of about 114 mmHg and a partial pressure of water of about 1.18 mmHg. At about 25° C. and a relative humidity of about 25 percent, the carbon-carbon composite sorbent 124 may exhibit a water uptake within a range of from about 1.00 weight percent to about 2.00 weight percent of the carbon-carbon composite sorbent 124 when the carbon-carbon composite sorbent is exposed to a stream having a partial pressure of $CO_2$ of about 114 mmHg and a partial pressure of water of about 6.09 mmHg. At about 0° C. and a relative humidity of about 50 percent, the carbon-carbon composite sorbent 124 may exhibit a water uptake within a range of from about 18.00 weight percent to about 22.00 weight percent of the carbon-carbon composite sorbent 124, such as from about 18.00 weight percent to about 20.00 weight percent, or from about 20.00 weight percent to about 22.00 weight percent of the carbon-carbon composite sorbent 124 when the carbon-carbon composite sorbent is exposed to a stream having a partial pressure of $CO_2$ of about 114 mmHg and a partial pressure of water of about 2.36 mmHg. At about 25° C. and a relative humidity of about 50 percent, the carbon-carbon composite sorbent 124 may exhibit a water uptake within a range of from about 18.00 weight percent to about 21.00 weight percent of the carbon-carbon composite sorbent 124 when the carbon-carbon composite sorbent is exposed to a stream having a partial pressure of $CO_2$ of about 114 mmHg and a partial pressure of water of about 12.17 mmHg.

An isostatic heat of adsorption of $CO_2$ of the carbon-carbon composite sorbent 124 may be within a range of from about 25.0 KJ/mol to about 30.0 KJ/mol. An isostatic heat of adsorption of water of the carbon-carbon composite sorbent 124 may be within a range of from about 43.00 KJ/mol to about 47.00 KJ/mol. An isostatic heat of adsorption of oxygen of the carbon-carbon composite sorbent 124 may be within a range of from about 14.00 KJ/mol to about 15.00 KJ/mol, and the isostatic heat of adsorption of nitrogen of the carbon-carbon composite sorbent 124 may be within a range of from about 17.00 kJ/mol to about 19.00 KJ/mol.

The carbon-carbon composite sorbent 124 may be used in carbon capture systems to capture $CO_2$ from, such as from flue gases at point sources (e.g., power plants, refineries, cement plants, steel plants). For example, the carbon-carbon composite sorbent 124 may be used in pressure swing adsorption (PSA) systems and/or vacuum swing adsorption (VSA) systems. In some embodiments, the carbon-carbon composite sorbent 124 are used in a multi-bed, solid-state sorbent contactor. By way of non-limiting example, the carbon-carbon composite sorbent 124 may be disposed in a sorbent bed. A $CO_2$-containing gas may be passed through the sorbent bed and contact the carbon-carbon composite sorbent 124. Responsive to contacting the $CO_2$-containing gas, the carbon-carbon composite sorbent 124 may adsorb $CO_2$ from the $CO_2$-containing gas. After the carbon-carbon composite sorbent 124 is loaded with $CO_2$, the carbon-carbon composite sorbent 124 may be regenerated to release the adsorbed $CO_2$ and generate a concentrated $CO_2$ gas. For example, the loaded carbon-carbon composite sorbent 124 may be exposed to a low pressure and/or exposed to an elevated temperature to release the adsorbed $CO_2$. After regenerating the carbon-carbon composite sorbent 124, the carbon-carbon composite sorbent 124 may be exposed to the $CO_2$-containing gas to remove $CO_2$ from the $CO_2$-containing gas.

Forming the carbon-carbon composite sorbent 124 from the feed material 104 and the porous carbon material 105 may facilitate forming the carbon-carbon composite sorbent 124 with a higher yield compared to conventional methods of forming carbon sorbents. For example, since the porous carbon material 105 is substantially carbonized and substantially free of volatile materials when forming the coated porous carbon material 108, the coated porous carbon material 108 may exhibit substantially less material loss upon heating in the oven 114 and/or the furnace 120 compared to materials that are not carbonized. Since only the coating material 146 includes volatile materials, only portions of the coating material 146 may exhibit material loss during the carbonization process in the furnace 120. Therefore, the carbon-carbon composite sorbent 124 may be formed with a greater yield compared to conventional methods of forming carbon sorbent materials. In some embodiments, the yield of the carbon-carbon composite sorbent 124 may be within a range of from about 60% to about 90%, such as from about 60% to about 70%, from about 70% to about 80%, or from about 80% to about 90%. In other words, for every about 100 kg of the combined feed material 104 and porous carbon material 105, the system 100 may be configured to generate from about 60 kg to about 90 kg of the carbon-carbon composite sorbent 124. However, the disclosure is not so limited, and the yield of the carbon-carbon composite sorbent may be different than that described.

In addition, forming the carbon-carbon composite sorbent 124 according to the methods described herein, may facilitate forming the carbon-carbon composite sorbent 124 without extrusion. For example, since the porous carbon material 105 may exhibit a desired structure (e.g., size, shape, and only once (e.g., without heating the coated porous carbon material 108 more than once). In some embodiments, the porous carbon material 105 is activated and the carbon-carbon composite sorbent 124 is formed to have a desired surface area without activation. For example, the carbon-carbon composite sorbent 124 may be formed without activating the adsorption material 148.

The carbon-carbon composite sorbent 124 may be advantageous for $CO_2$ recovery. For example, the carbon-carbon composite sorbent 124 may exhibit improved $CO_2$ adsorption capacity, improved selectivity to $CO_2$ relative to water and nitrogen, and reduced water adsorption compared to other carbon sorbents. The particular composition and the types of covalent bonds of the adsorption material 148 facilitate the improved $CO_2$ capture properties (e.g., $CO_2$ capacity, selectivity to $CO_2$) of the carbon-carbon composite sorbent 124. In addition, the carbon-carbon composite sorbent 124 may be regenerated at lower cost (e.g., with less energy) compared to conventional carbon sorbent materials, reducing the cycle time, and increasing the utilization of the carbon-carbon composite sorbent 124. In addition, the carbon-carbon composite sorbent 124 can be regenerated with less energy compared to the liquid amine sorbents and alkali sorbents. Further, the carbon-carbon composite sorbent 124 may exhibit comparable $CO_2$ adsorption, capacity, and selectivity to $CO_2$ compared to carbon sorbents that include a uniform composition therethrough.

Example

Carbon-carbon composite sorbents were formed with different amounts of porous carbon, different nitrogen-containing materials, and different amounts of water in the feed material. Carbon-carbon composite sorbents 2 and 4 were carbonized at a lower temperature than carbon-carbon composite sorbents 1, 3, and 5. The composition of the feed material for each carbon-carbon composite sorbent formulation and the carbonization temperature of each formulation is shown in Table 1 below.

TABLE 1

| Carbon-Carbon Composite Sorbent | Porous Carbon (wt. %) | Sugar (dextrose) (wt. %) | Nitrogen Compound | Nitrogen Compound (wt. %) | Water (wt. %) | Carbonization temperature (° C.) |
|---|---|---|---|---|---|---|
| 1 | 33.7 | 25.7 | Glycine | 10.8 | 29.8 | 950 |
| 2 | 33.7 | 25.7 | Glycine | 10.8 | 29.8 | 600 |
| 3 | 29.0 | 22.1 | Guanidine Carbonate | 22.1 | 26.8 | 950 |
| 4 | 29.0 | 22.1 | Guanidine Carbonate | 22.1 | 26.8 | 600 |
| 5 | 28.0 | 21.5 | Lysine HCl | 23.8 | 26.7 | 950 | form) and the structure of the carbon-carbon composite sorbent 124 corresponds to the structure of the porous carbon material 105, the carbon-carbon composite sorbent 124 may be formed to have a desired structure without extrusion.

The carbon-carbon composite sorbent 124 may be formed without extruding the coated porous carbon material 108, or either of the coating material 146 or the adsorption material 148. In some embodiments, the carbon-carbon composite sorbent 124 is formed with fewer acts, such as with fewer heating processes compared to other carbon sorbents. The carbon-carbon composite sorbent 124 may be formed with only one heating process (e.g., in the furnace 120). For example, the carbon-carbon composite sorbent 124 may be formed by heating the coated porous carbon material 108

Various properties of pellets of the carbon-carbon composite sorbents of Table 1 were measured, as shown in Table 2 below. The measured properties included the BET surface area, the BJH pore volume, the t-plot micropore volume, and the BJH average pore width.

TABLE 2

| Carbon-Carbon Composite Sorbent | BET Surface Area (m²/g) | BJH Pore Volume (cm³/g) | t-plot micropore volume (cm³/g) | BJH Average Pore Width (nm) |
|---|---|---|---|---|
| 1 | 418 | 0.080 | 0.16 | 6.2 |
| 2 | 372 | 0.077 | 0.15 | 5.9 |
| 3 | 474 | 0.084 | 0.19 | 5.9 |

TABLE 2-continued

| Carbon-Carbon Composite Sorbent | BET Surface Area (m²/g) | BJH Pore Volume (cm³/g) | t-plot micropore volume (cm³/g) | BJH Average Pore Width (nm) |
|---|---|---|---|---|
| 4 | 402 | 0.076 | 0.16 | 5.8 |
| 5 | 339 | 0.081 | 0.13 | 6.2 |

Surfaces of the carbon-carbon composite sorbents (corresponding to the adsorption material 148) were analyzed using X-ray photoelectron spectroscopy (XPS) to determine the elemental composition on the surface of the carbon-carbon composite sorbents. The elemental composition on the surface of the carbon-carbon composite sorbents is exclusive of hydrogen (e.g., the XPS cannot detect hydrogen). Table 3 below shows the elemental composition of the surface of the carbon-carbon composite sorbent formulations exclusive of hydrogen. As shown in Table 3, carbon-carbon composite sorbents 2 and 4, which were pyrolyzed at relatively lower temperatures than the other carbon-carbon composite sorbents, had a relatively high atomic percent of nitrogen and oxygen at the surface. Thus, the carbonization temperature may affect the atomic percent of nitrogen and oxygen at the surface.

TABLE 4

| Carbon-Carbon Composite Sorbent | O—C (at. %) | O═C (at. %) |
|---|---|---|
| 1 | 54.7 | 45.3 |
| 2 | 34.4 | 65.6 |
| 3 | 62.6 | 37.4 |
| 4 | 59.2 | 40.8 |
| 5 | 48.3 | 51.7 |

It is believed that the carbon to oxygen double bonds are primarily a mixture of pyrone and pyridone groups. With reference to Table 4, at least about one-third of the oxygen atoms at the surface of the carbon-carbon composite sorbent are double bonded to a carbon atom.

Table 5 below shows the atomic percent of carbon atoms on the surface of the carbon-carbon composite sorbents that are covalently bonded to different atoms. In Table 5, C—C, C—H, C—O, and C—N represent carbon atoms single bonded to carbon, hydrogen, oxygen, and nitrogen, respectively; C═O and N—C—O respectively represent a carbon atom double bonded to an oxygen atom or a carbon atom single bonded to an oxygen atom and a nitrogen atom; O—C═O and N—C—O represent a carbon atom double bonded to oxygen and single bonded to either another oxygen atom or a nitrogen atom, respectively; and pi-pi represents the atomic percent of carbon atoms on the surface of the carbon-carbon composite sorbent that are conjugated.

TABLE 5

| Carbon-Carbon Composite Sorbent | C—C, C—H, (at. %) | C—O, C—N (at. %) | C═O, N—C—O (at. %) | O—C═O, N—C═O (at. %) | pi-pi |
|---|---|---|---|---|---|
| 1 | 62.7 | 17.2 | 6.9 | 3.0 | 10.2 |
| 2 | 54.1 | 22.4 | 8.5 | 2.9 | 12.1 |
| 3 | 67.7 | 14.3 | 6.4 | 2.1 | 9.4 |
| 4 | 60.2 | 16.7 | 9.8 | 3.8 | 9.5 |
| 5 | 66.1 | 15.4 | 6.8 | 2.5 | 9.2 |

TABLE 3

| Carbon-Carbon Composite Sorbent | C (at. %) | N (at. %) | O (at. %) |
|---|---|---|---|
| 1 | 93.3 | 3.3 | 3.4 |
| 2 | 84.9 | 7.9 | 7.2 |
| 3 | 93.2 | 2.8 | 4.0 |
| 4 | 86.7 | 8.8 | 4.5 |
| 5 | 94.4 | 2.5 | 3.1 |

The relative compositions of the oxygen species, the carbon species, and the nitrogen species on the surface of the carbon-carbon composite sorbents was measured using XPS and are shown in Table 4 through Table 6 below. Table 4 shows the type of covalent bonds formed by the oxygen atoms of the oxygen species on the surface of the carbon-carbon composite sorbents. In Table 4, O—C represents the atomic percent of oxygen atoms on the surface of the carbon-carbon composite sorbent that is single bonded to a carbon atom; and O—C represents the atomic percent of oxygen atoms on the surface of the carbon-carbon composite sorbent that is double bonded to a carbon atom.

As shown in Table 5, greater than about 2.0 atomic percent (e.g., greater than about 3.0 atomic percent) of the carbon atoms on the surface of the carbon-carbon composite sorbents were double bonded to an oxygen atom and single bonded to one of another oxygen atom or a nitrogen atom. In addition, the surface of carbon-carbon composite sorbents included conjugated carbon, indicative of the presence of graphite-like carbon bonding, which occurs only when there is sufficient π-bond conjugation to allow for π and π* orbitals to form in a sufficiently large area. It is believed that the pi electrons of the pyrone and amine groups enhance the basicity of the surface of the carbon-carbon composite sorbent, increasing the adsorption of $CO_2$ by the carbon-carbon composite sorbent.

Table 6 shows the types of covalent bonds of the nitrogen species on the surface of the carbon-carbon composite sorbents. The carbon-carbon composite sorbents showed no evidence of quaternary or oxidized nitrogen and each included a mixture of pyridone/pyrrole and pyridine type carbon to nitrogen single bonds. With reference to Table 6, it appears that a lower carbonization temperature (of carbon-carbon composite sorbent composites 2 and 4) favors the formation of pyridine like nitrogen.

TABLE 6

| Carbon-Carbon Composite Sorbent | Pyridone and/or Pyrrole (at. %) | Pyridine (at. %) |
| --- | --- | --- |
| 1 | 61.0 | 39.0 |
| 2 | 42.6 | 57.4 |
| 3 | 50.5 | 49.5 |
| 4 | 37.3 | 62.7 |
| 5 | 70.4 | 29.6 |

Table 7 shows the IAST selectivity of some of the carbon-carbon composite sorbents to carbon dioxide relative to nitrogen at 30° C. and 60° C. The carbon-carbon composite sorbents were exposed to a gas including 15 volume percent carbon dioxide, the remaining portion of the gas including nitrogen. In addition, Table 7 shows the $CO_2$ capacity of the carbon-carbon composite sorbents measured by exposing the carbon-carbon composite sorbents to a gas stream including 15 volume percent $CO_2$ and 85 volume percent nitrogen gas ($N_2$) at the noted temperatures. The carbon-carbon composite sorbents exhibited a relatively high selectivity to $CO_2$ relative to nitrogen. The carbon-carbon composite sorbents carbonized at lower temperatures (carbon-carbon composite sorbents 2 and 4) exhibited higher selectivity to $CO_2$ relative to $N_2$.

TABLE 7

| Carbon-Carbon Composite Sorbent | $CO_2$ Capacity (wt. %) 114 mmHg (30° C.) | $CO_2$ Capacity (wt. %) 114 mmHg (60° C.) | IAST selectivity to $CO_2$ relative to $N_2$ at 30° C. | IAST selectivity to $CO_2$ relative to $N_2$ at 60° C. |
| --- | --- | --- | --- | --- |
| 1 | 2.39 | 1.15 | 14.49 | 12.27 |
| 2 | 1.95 | 0.84 | 16.67 | 14.07 |
| 3 | 2.55 | 1.21 | 14.81 | 12.98 |
| 4 | 2.22 | 1.03 | 17.33 | 15.11 |
| 5 | 1.95 | 0.91 | 13.13 | 10.74 |

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A carbon-carbon composite sorbent for removal of carbon dioxide from a gaseous material, the carbon-carbon composite sorbent comprising:

a base material including a mesoporous carbon material including pores having an average diameter within a range of from about 2 nm to about 50 nm; and an adsorption material on surfaces of the base material and surfaces defining the pores of the base material, the adsorption material having a different material composition than the base material, a nitrogen content of the adsorption material, exclusive of hydrogen, within a range of from about 2.0 atomic percent to about 3.0 atomic percent, wherein a thickness of the adsorption material is within a range of from about 5 Å to about 20 Å, and wherein the adsorption material has a higher nitrogen content than the base material and includes greater than about 2.0 atomic percent nitrogen exclusive of hydrogen in the adsorption material, a nitrogen content of the carbon-carbon composite sorbent within a range of from about 0.20 atomic percent to about 1.0 atomic percent.

2. The carbon-carbon composite sorbent of claim 1, wherein the carbon-carbon composite sorbent exhibits a selectivity to carbon dioxide relative to nitrogen greater than about 14.00 at about 30° C. and about 760 mmHg total pressure when exposed to a gas including about 15 volume percent carbon dioxide and about 85 volume percent nitrogen.

3. The carbon-carbon composite sorbent of claim 1, wherein the adsorption material includes a greater atomic percent of oxygen than the base material.

4. The carbon-carbon composite sorbent of claim 1, wherein the base material includes a greater atomic percent of carbon than the adsorption material.

5. The carbon-carbon composite sorbent of claim 1, wherein the adsorption material includes:
   a carbon content, exclusive of hydrogen in the adsorption material, within a range of from about 85.0 atomic percent to about 95.0 atomic percent; and
   an oxygen content, exclusive of hydrogen in the adsorption material, within a range of from about 2.0 atomic percent to about 8.0 atomic percent.

6. The carbon-carbon composite sorbent of claim 1, wherein the nitrogen content of the adsorption material, exclusive of hydrogen, is greater than about 4.0 atomic percent.

7. The carbon-carbon composite sorbent of claim 1, wherein a density of the carbon-carbon composite sorbent is greater than about 0.50 g/cm$^3$.

8. The carbon-carbon composite sorbent of claim 1, wherein the adsorption material includes from about 0.5 atomic percent to about 2.0 atomic percent sulfur, exclusive of hydrogen.

9. The carbon-carbon composite sorbent of claim 1, wherein the adsorption material includes one or more of pyridine groups, pyrrole groups, or pyrone groups.

10. The carbon-carbon composite sorbent of claim 9, wherein the base material is substantially free of pyridine groups, pyrrole groups, or pyrone groups.

11. A carbon-carbon composite sorbent for removal of carbon dioxide from a gaseous material, the carbon-carbon composite sorbent comprising:
   a base material including a mesoporous carbon material including pores having an average diameter within a range of from about 2 nm to about 50 nm; and
   an adsorption material on surfaces of the base material and surfaces defining the pores of the base material, the adsorption material having a different material composition than the base material, a nitrogen content of the adsorption material, exclusive of hydrogen, within a range of from about 2.0 atomic percent to about 3.0 atomic percent,
   wherein the adsorption material includes:
   a carbon content, exclusive of hydrogen in the adsorption material, within a range of from about 85.0 atomic percent to about 95.0 atomic percent; and an oxygen content, exclusive of hydrogen in the adsorption material, within a range of from about 2.0 atomic percent to about 8.0 atomic percent,
   wherein the adsorption material has a higher nitrogen content than the base material and includes greater than about 2.0 atomic percent nitrogen exclusive of hydrogen in the adsorption material, a nitrogen content of the carbon-carbon composite sorbent within a range of from about 0.20 atomic percent to about 1.0 atomic percent.

12. The carbon-carbon composite sorbent of claim 11, wherein the adsorption material includes a greater atomic percent of oxygen than the base material.

13. The carbon-carbon composite sorbent of claim 11, wherein the base material includes a greater atomic percent of carbon than the adsorption material.

14. The carbon-carbon composite sorbent of claim 11, wherein the adsorption material includes one or more of pyridine groups, pyrrole groups, or pyrone groups.

15. The carbon-carbon composite sorbent of claim 14, wherein the base material is substantially free of pyridine groups, pyrrole groups, or pyrone groups.

16. A carbon-carbon composite sorbent for removal of carbon dioxide from a gaseous material, the carbon-carbon composite sorbent comprising:
   a base material including a mesoporous carbon material including pores having an average diameter within a range of from about 2 nm to about 50 nm; and
   an adsorption material on surfaces of the base material and surfaces defining the pores of the base material, the adsorption material having a different material composition than the base material, a nitrogen content of the adsorption material, exclusive of hydrogen, within a range of from about 2.0 atomic percent to about 3.0 atomic percent,
   wherein the adsorption material includes one or more of pyridine groups, pyrrole groups, or pyrone groups,
   wherein the base material is substantially free of pyridine groups, pyrrole groups, or pyrone groups,
   wherein the adsorption material has a higher nitrogen content than the base material and includes greater than about 2.0 atomic percent nitrogen exclusive of hydrogen in the adsorption material, a nitrogen content of the carbon-carbon composite sorbent within a range of from about 0.20 atomic percent to about 1.0 atomic percent.

17. The carbon-carbon composite sorbent of claim 16, wherein the adsorption material includes a greater atomic percent of oxygen than the base material.

18. The carbon-carbon composite sorbent of claim 16, wherein the base material includes a greater atomic percent of carbon than the adsorption material.

19. The carbon-carbon composite sorbent of claim 16, wherein a density of the carbon-carbon composite sorbent is greater than about 0.50 g/cm$^3$.

20. The carbon-carbon composite sorbent of claim 16, wherein the adsorption material includes from about 0.5 atomic percent to about 2.0 atomic percent sulfur, exclusive of hydrogen.

* * * * *